United States Patent [19]

Bähr

[11] Patent Number: 5,051,194

[45] Date of Patent: Sep. 24, 1991

[54] PROCEDURE AND CHAMBER FILTER PRESS FOR DEWATERING SLURRIES AND SIMILAR SUBSTANCES

[76] Inventor: Albert Bähr, Am Hungerberg 10, D-6682 Ottweiler 2, Fed. Rep. of Germany

[21] Appl. No.: 520,896

[22] Filed: May 8, 1990

[30] Foreign Application Priority Data

May 10, 1989 [DE] Fed. Rep. of Germany ....... 3915298
Apr. 11, 1990 [DE] Fed. Rep. of Germany ....... 4011776

[51] Int. Cl.⁵ .............................................. B30B 9/24
[52] U.S. Cl. ................................. 210/770; 210/783; 210/386; 210/401
[58] Field of Search ............... 210/400, 401, 386, 770, 210/783; 100/218, 3, 258.4, 218, 269 R, 244, 264, 214, 219, 151–154, 99, 222, 118–120

[56] References Cited

U.S. PATENT DOCUMENTS 4,153,550  5/1979  Lautrette .......................... 210/401

Primary Examiner—Frank Sever
Attorney, Agent, or Firm—Armstrong, Nikaido, Marmelstein, Kubovcik & Murray

[57] ABSTRACT

The present invention relates to a procedure and a device for dewatering slurry and similar substances, in which the slurry is fed into a completely enclosed slurry chamber (2) by a pump (7), and a hydrostatic pressure of adjustable magnitude is produced. The slurry chamber (2) is subsequently isolated from the pump (7), the volume of the slurry chamber (2) is reduced and a mechanical dewatering pressure is generated.

41 Claims, 16 Drawing Sheets

PROCEDURE AND CHAMBER FILTER PRESS FOR DEWATERING SLURRIES AND SIMILAR SUBSTANCES

The present invention relates to a procedure for dewatering slurry and similar substances in which the slurry is fed at high pressure into an enclosed slurry chamber comprising at least one filter surface and a hydrostatic pressure is generated in the slurry chamber to induce the dewatering process. The invention further relates to a chamber filter press to implement the procedure with at least one completely enclosed slurry chamber comprising filter surfaces where the slurry chamber comprises a slurry inlet which is connected by means of a pipe to the pump generating the filtration pressure.

The process of dewatering slurry, which accumulates in waste-water treatment plants for example, in chamber filter presses after the addition of organic or inorganic flocculators or filter aids is known in the art. With chamber filter presses of the prior art the slurry is fed into completely enclosed filter chambers, which are usually grouped into batteries consisting of a plurality of filter chambers, and the medium to be dewatered is pumped at high pressure until the desired total solids content is achieved. During this process the water contained in the slurry is passed through the separating walls of the individual filter chambers, where said walls consist of a filtration material. The drawback of this procedure and design of chamber filter press of the prior art is that, despite the high technical input, the efficiency with which the pressure is transferred to the substance to be dewatered diminishes from chamber to chamber in the running direction.

It is the object of the present invention, based on the prior art described in the introduction, to provide a procedure and chamber filter press to implement the procedure which guarantees a considerable improvement in efficiency and, furthermore, an improved throughput rate with lower technical input.

With a procedure as described in the introduction, this object is achieved in that after attaining an adjustable pressure level the slurry chamber is isolated from the pump and that the volume of the slurry chamber is subsequently reduced and a mechanical dewatering pressure is produced which is greater than the hydrostatic pressure attained. In this way it can be guaranteed that above the pressure level at which further dewatering by means of the hydrostatic pressure would only be possible with correspondingly high energy costs the slurry chamber which is then isolated from the pump is pressed together mechanically and further dewatering takes place by means of the mechanically induced pressure.

In a preferred embodiment of this procedure, the filter surface together with the filter cake produced is removed from the slurry chamber in order to discharge the filter cake. In this way, the costly replacement of the filter cloth involved in dewatering processes of the prior art using such filter presses can be avoided.

In a particularly preferred embodiment of the present invention, the slurry is pumped into the slurry chamber at a number of locations simultaneously. In this way, the selected hydrostatic pressure is attained comparatively quickly since the necessity for the filtration pressure to be transmitted through the entire substance contained in the chamber is avoided.

In a particularly advantageous improvement to the invention, a plurality of slurry chambers are operated parallel to each other and alternately in cycles, where the pump generating the hydrostatic pressure is driven continuously and the feed to the individual slurry chambers is switched such that the slurry feed and the discharge of the filter cake proceed quasi continuously though from different slurry chambers.

As mentioned above, a further object of the invention is a chamber filter press to implement the above-described procedure.

Chamber filter presses of the prior art consist of a fixed head section and a large number of grooved plates made of iron, wood, ebonite or special steel and other materials suspended from steel runners and covered in filter cloths. The plates are pressed together by means of a movable head section and a spindle. This can be carried out hydraulically with large filter units. Between every second such plate, therefore, hollow spaces are formed by the raised edges of the plates or by hollow frames suspended between every second plate. In the middle of the plate or at the edge, the chamber filter presses have an inlet channel. The press is filled under pressure generated by the pump. The filtrate passes through the cloths and then flows downwards though grooves and runs though a channel to discharge cocks provided for each plate. With some designs, a special rinsing water channel is provided to rinse the filter cake where compressed air is generally used for drying after the rinsing process. To empty the filter, the press is opened, and the plates are separated, during which the filter cake then either falls out itself or must be removed manually. The emptying and cleaning of the seal surfaces, and the reassembly and closing of the presses takes a considerable amount of manual work and time, and there is extensive wear on the filter cloths.

In accordance with the invention a completely novel chamber filter press of the type described in the introduction is proposed which is characterised in that the filter surfaces are located in the slurry chamber between stationary and movable pressure plates and that these can be pressurised after the pump has been switched off.

In particular, it is preferred that the slurry chamber comprises a cover containing the movable pressure plates and a base containing the fixed pressure plates, and that the cover can be moved relative to the base between an open and a closed position by means of the movable pressure plates.

This produces a particularly preferred embodiment in which the slurry chamber consists of the filter surfaces in the form of a filter belt running intermittently in a horizontal plane and a straight direction and of a pressure membrane, and that the pressure membrane is provided with enclosing sealing lips which in the closed position lie flush with the filter belt thereby forming a seal. In this way the advantage can be achieved that the filter cake produced can be discharged from the slurry chamber by means of the filter belt and a new filter belt section can be positioned in the slurry chamber simultaneously.

In particular, it is advantageous for guides to be provided for the vertical movement of the movable pressure plates and the sealing lips.

In a preferred embodiment in this connection, the guides for the movable pressure plates and the sealing lips are formed as common guides.

This results in a preferred embodiment where the guides are formed as vertical spigots on one of the pressure plates of a pair of pressure plates, where said spigots slide into guide bores located in the sealing lips and the other pressure plate as appropriate.

In order to ensure the simplest possible guide system for the sealing lips an advantageous feature of the invention is that the sealing lips consist of a rigid reinforcement strip made of plastic or a similar material and of a sealing element made of a flexible material enclosing the periphery of the pressure membrane, that the reinforcement strip is attached to the upper face of the edge zone of the pressure membrane and the sealing element for the reinforcement strip is attached opposite this to the lower face of the edge zone, that the sealing lip comprises an edge which protrudes beyond the periphery of the pressure membrane, and that the guide bores are formed in the edge.

In a particularly preferred embodiment the pressure surfaces and the pressure membrane are located between the fixed and movable pressure plates which are configured in opposed pairs.

In particular, it is advantageous for a plurality of adjacent pressure plate pairs to be provided whereby it is particularly preferred for the lower pressure plates to be rigidly mounted and for it to be possible to move the upper pressure plates against the lower pressure plates by means of hydraulic high-pressure generators, or vice versa. This design permits the entire slurry chamber to be highly pressurised mechanically in extremely simple fashion after it has been isolated from the pressure pump.

In the chamber filter press in accordance with the invention the pressure membrane is connected to the movable pressure plates at least in a central area such that the pressure membrane forms an integral part of the cover which can be raised relative to the base.

In order to avoid having to replace the entire pressure membrane in the case of worn seals, it is advantageous to provide replaceable consumables at the point of contact between the sealing lips and the filter belt.

In particular it is preferred that the pressure membrane be in the form of a rubber cover connected to the sealing lips.

In a very particularly preferred embodiment of the invention the sealing lips are positively controlled and can be moved up and down by means of a drive.

In this connection, it is advantageous that the drive be formed by a number of controllable pressure generators located on the sealing lips, where said pressure generators optionally press the sealing lips relative to the upper pressure plate towards the filter belt or raise it from the latter. This embodiment provides for a substantial design simplification while ensuring correct operating in that by actuation of the pressure generators or the sealing lip drive the slurry chamber can be opened or closed independently of the pressure and opening strokes of the movable pressure plates. This permits the hydraulic high-pressure generators to be designed simply and with a smaller stroke.

In particular, it is preferred that the pressure generators be in the form of pneumatic cylinders which can be actuated to open and close the slurry chamber by raising and lowering the sealing lips.

In a preferred embodiment the pneumatic cylinders are braced against the upper pressure plates such that the sealing pressure is increased by compressing the air in the pneumatic cylinders in the pressure stroke of the upper pressure plates.

This embodiment can advantageously be improved by providing two pneumatic cylinders at each end of an upper pressure plate. A number of pneumatic cylinders are advantageously distributed over the length of the pressure plates located on the face ends of the slurry chamber An advantageous embodiment of the invention can be provided by connecting the piston rods of the pneumatic cylinders to the reinforcement strip of the sealing lip by means of an articulated joint.

In particular it is advantageous for the connection of the piston rods to the reinforcement strip to be opposite the centre line of the sealing element. This guarantees that the sealing pressure is distributed as uniformly as possible.

In the embodiment in which the sealing lips have their own drive the hydraulic high-pressure generators are advantageously in the form of single cylinders (71) with one plunger. This ensures simplicity of design since the closing motion of the slurry chamber is achieved by means of the pneumatic cylinder or the separate drive of the sealing lips.

As an alternative to the above-described embodiment, the sealing lips can be spring-loaded in the direction of the filter belt. In this connection the spring tension is selected such that in the position of the movable pressure plates prior to the pressure stroke the sealing pressure generated by the springs is guaranteed to be sufficient to prevent the slurry escaping laterally between the pressure membrane and the filter belt at the hydrostatic pressure produced by the pump.

Furthermore, the springs acting on the sealing lips are advantageously supported against the movable pressure plates such that the sealing pressure is simultaneously generated during the pressure stroke.

A particularly preferred embodiment of the invention can be provided by having the hydraulic high-pressure generators connect the stationary pressure plates with the movable pressure plates to form enclosed frames. This permits a high mechanical strength to be achieved with the simplest of technical means whereby correspondingly high pressures can be absorbed within the enclosed frames and heavy abutments in the form of bases or similar are not required.

It is further particularly advantageous for the hydraulic high-pressure generators to be in the form of double cylinders where each double cylinder contains one piston in the form of a plunger and a second piston in the form of a closing piston. This permits the slurry chamber to be closed using the closing piston, independent of the actual pressure stroke of the movable pressure plates, such that the slurry chamber is definitely sealed by means of the sealing lips.

In a particularly preferred embodiment according to the invention the slurry chamber comprises a plurality of slurry inlets, as a result of which the slurry chamber can be filled exceedingly rapidly and the hydrostatic pressure can be generated with a high degree of efficiency.

In this respect it is preferred that the slurry inlets be located on the centre line of the pressure membrane, where they are connected to a collecting pipe via individual pipes.

It is preferred that the slurry inlets be provided with locking valves and the collecting pipe with a non-return valve. This permits the pressure generated by the pump to be effectively isolated from the slurry chamber when the chamber filter press pressure stroke occurs which is created by the high-pressure generators.

One or a plurality of valve-actuated outlets of a pipe are preferably provided in the pressure membrane for a washing or cleaning medium, in order to permit the filter cake to be washed.

In order to improve the dewatering process and facilitate removal of the filtrate, a preferred embodiment according to the invention comprises a plate with upward-opening filtrate channels between the filter belt and the lower pressure plates. The filter belt lies flush with this plate. In this respect, it is thus preferred that the plate be manufactured from a low-friction plastic, since during the removal of the filter cake and the positioning of a new filter belt section, the filter belt is in direct contact with the plate when sliding over it.

A particularly preferred embodiment according to the invention provides for a plurality of chamber filter presses to be configured parallel to one another, the collecting pipes of the chamber filter presses to be connected to a main pipe, the main pipe to be maintained under continuous pressure by the pump, and a control system to be provided which controls the non-return valves, the locking valves, the high-pressure generators, the pneumatic cylinders and the drive of the filter belt in accordance with the working cycle of the individual chamber filter presses, such that the slurry feed and the discharge of the filter cake proceed more or less continuously, though from different slurry chambers.

An alternative embodiment according to the invention can be created by ensuring that a plurality of chamber filter presses are configured parallel to one another, the collecting pipes of the chamber filter presses are connected to a main pipe, the main pipe is maintained under continuous pressure by the pump, and a control system is provided which controls the non-return valves, the locking valves, the high-pressure generators, the pneumatic cylinders and the drive of the filter belt in accordance with the working cycle of the individual chamber filter presses, such that the slurry feed and the discharge of the filter cake proceed more or less continuously, though from different slurry chambers.

These two embodiments ensure that a more or less continuously working chamber filter press is created.

The invention is described below in further detail, with reference to the embodiments illustrated in the drawings, in which.

Figure 1:
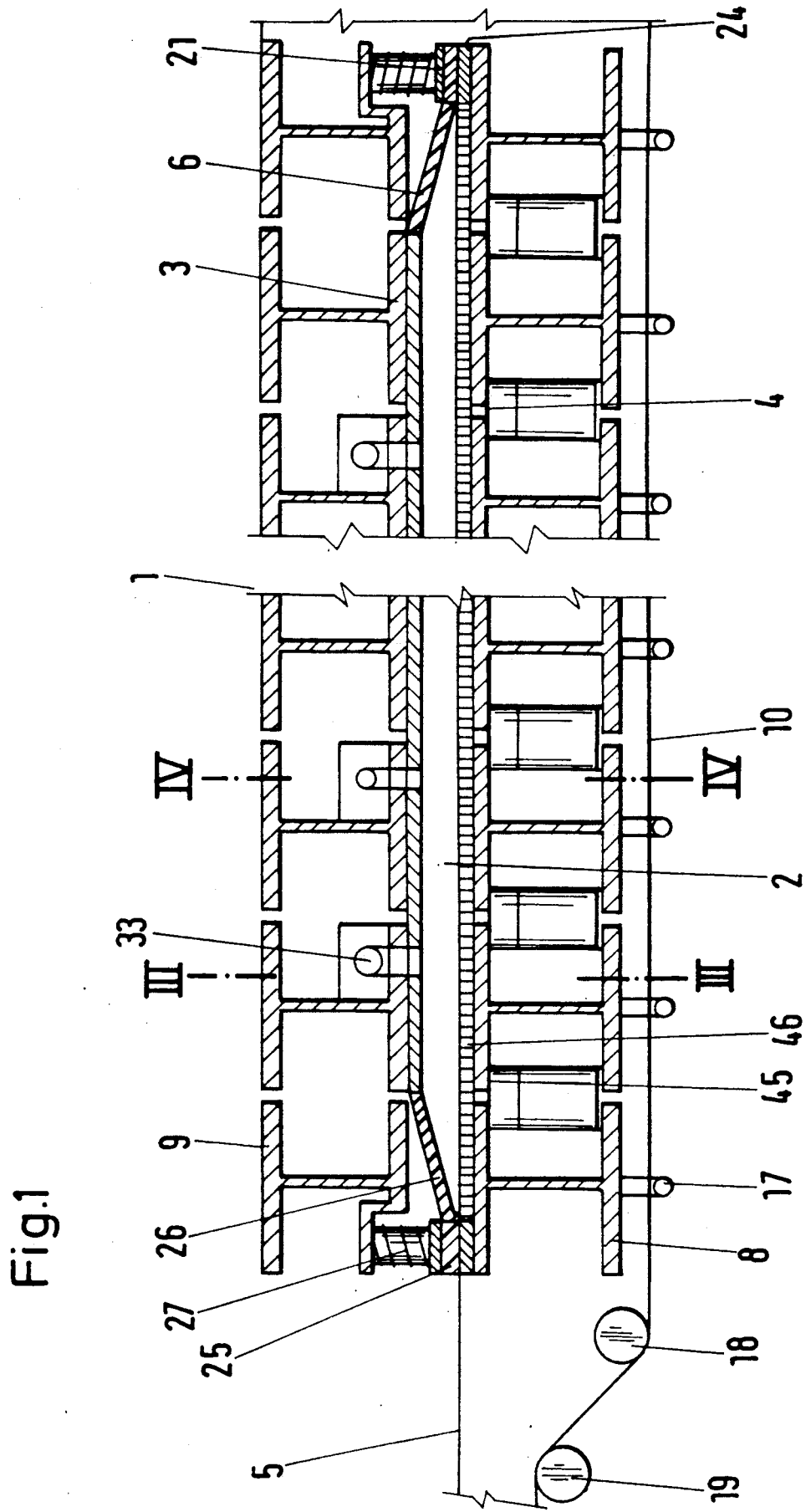
FIG. 1 shows a highly schematic cross-sectional side view of a section of a chamber filter press according to the invention.

The chamber filter press in accordance with the invention, designated 1 overall, as diagrammatically represented in FIGS. 1 to 4, serves to dewater slurry and similar substances and is especially intended for slurries which exclude the use of flocculators, such as, for example, ceramic slurries or food slurries.

The chamber filter press 1 comprises a completely enclosed slurry chamber 2, consisting of a cover 3 and a base 4. The slurry chamber 2 contains a filter surface 5 which retains the filter cake and allows the filtrate to pass through. Above the filter surface 5 is located a pressure membrane 6 by means of which a supplementary mechanical pressure is generated as described below once an adjustable pressure level has been attained for a hydrostatic pressure which is produced in the slurry chamber 2 by means of a pump 7.

As illustrated, the filter surface 5 is located in the slurry chamber 2 between stationary pressure plates 8, which form an integral part of the base 4, and movable pressure plates 9, which form an integral part of the cover 3. In the embodiment illustrated in FIG. 1, the pressure plates 8 and 9 are in the form of H-beams, because this shape is an inexpensive means of absorbing high pressures.

The cover 3 can be raised relative to the base 4, as described below, to give access to the filter surface 5.

In the preferred embodiment, the filter surface 5 is formed by a filter belt 10 running intermittently in a horizontal plane and a straight direction which can be moved by a drive (not shown) when the slurry chamber 2 is open.

Figure 5:
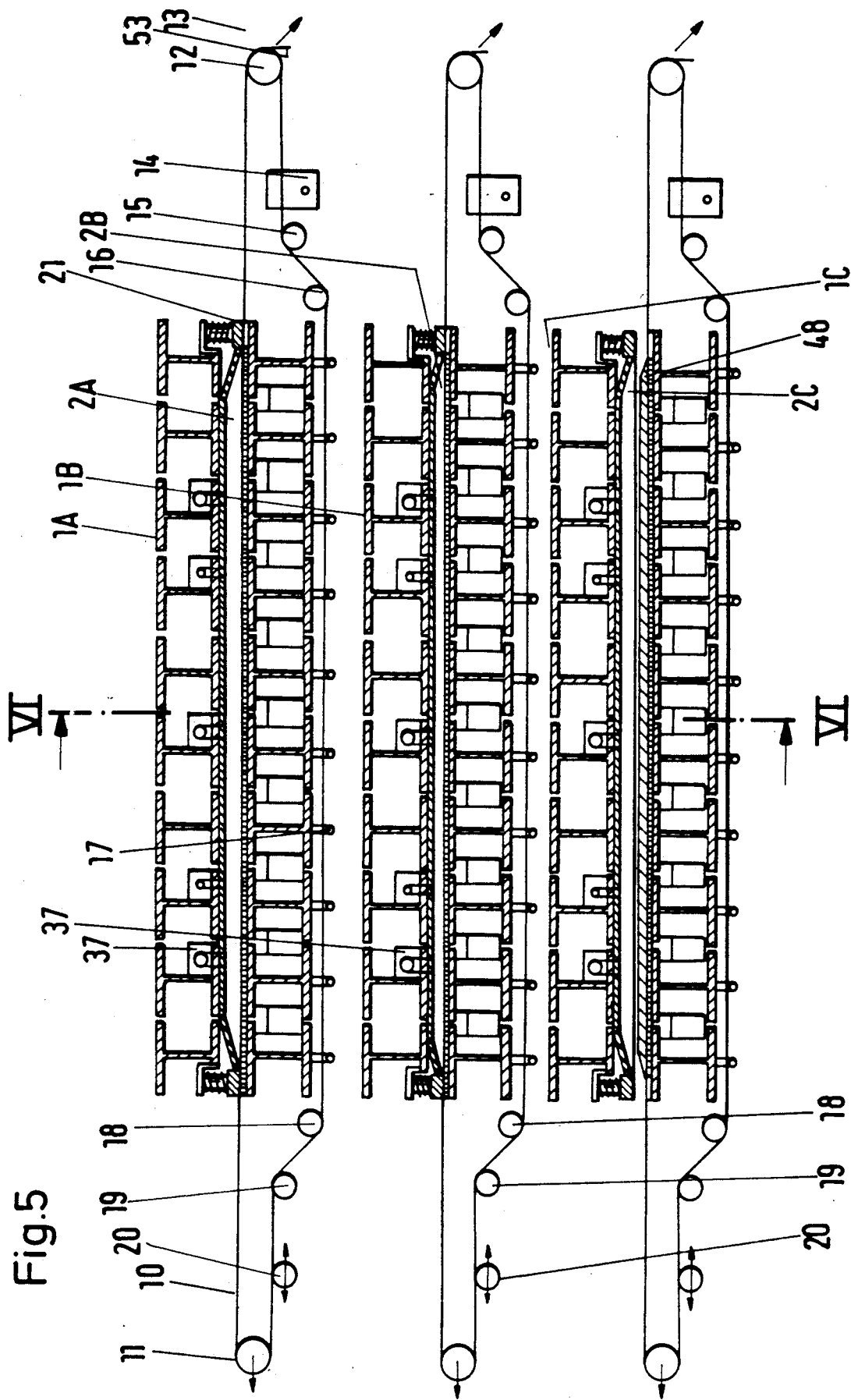
FIG. 5 shows an embodiment according to the invention in which a plurality of slurry chambers are configured parallel to one another and are operated alternately in cycles, where in addition details omitted from FIG. 1 are illustrated.

As apparent from FIG. 1 and in part from FIG. 5, the filter belt 10, starting from the left end of FIG. 5, runs over a spring-loaded idler 11 and then runs through the slurry chamber 2. A further idler 12 where the discharge 13 for the filter cake is positioned is located outside the slurry chamber 2. A scraper or knife 53 is provided at this location, which separates the filter cake 48 from the filter belt 10.

The filter belt 10 runs through a washing system 14 after the idler 12 in the running direction, over further idlers 15 and 16, and is fed through under the chamber filter press 1 on rods 17 or similar. The filter belt 10 then runs over rollers 18 and 19 and a further roller 20 back to the idler 11, where said roller 20 is provided with a known device (not shown) to ensure correct tracking of the filter belt 10.

As further shown, the pressure membrane 6 which encloses the slurry chamber 2 is provided with enclosing sealing lips 21, which in the closed position lie flush against the filter belt 10 to form a seal and thus completely close the slurry chamber 2.

The pressure membrane 6 and the filter surface 5 formed by the filter belt 10 are thus located between the fixed and movable pressure plates 8 and 9 which are configured in opposing pairs; a plurality of adjacent pressure plate pairs are provided. The lower pressure plates 8 in this configuration are rigidly mounted, while the upper pressure plates 9 can be moved relative to the lower pressure plates 8 by hydraulic high-pressure generators designated 22.

Figure 3:
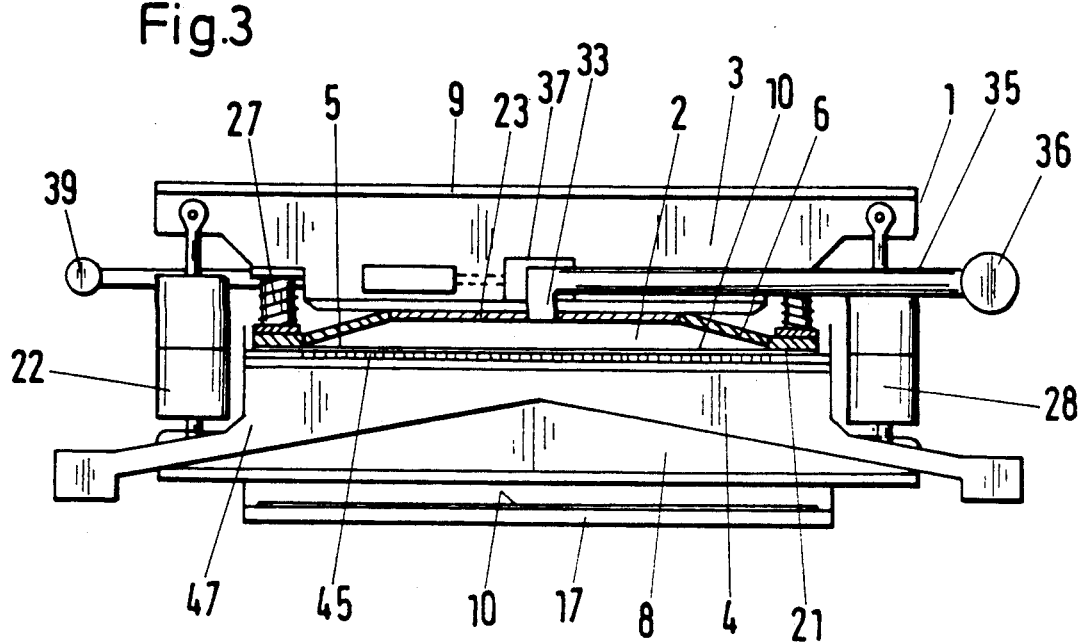
FIG. 3 shows a cross-sectional view along the line III—III of FIG. 1 on a smaller scale.
Figure 4:
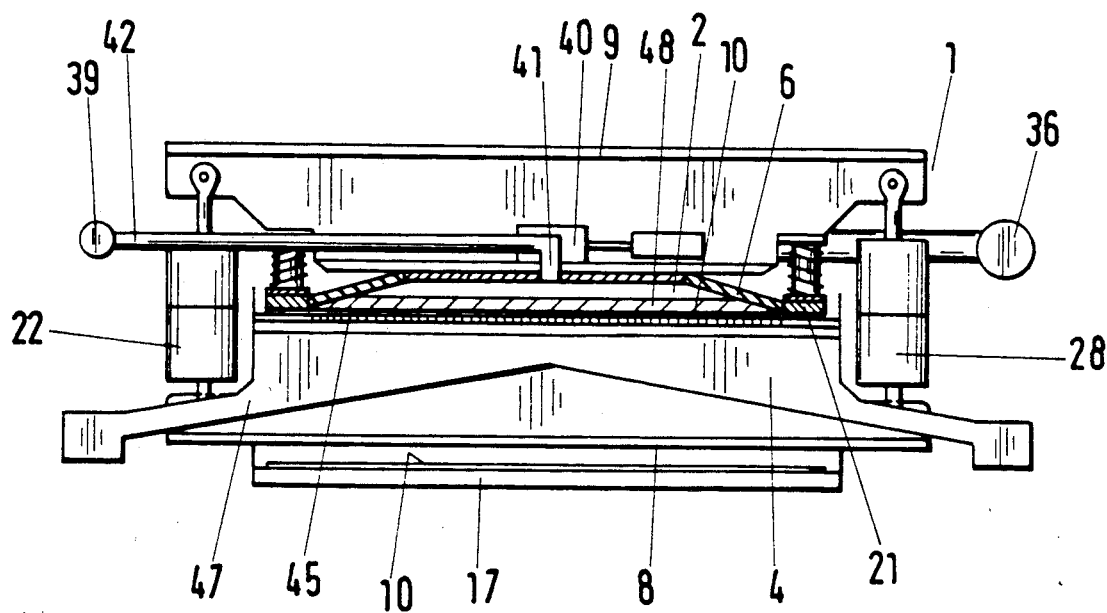
FIG. 4 shows a cross-sectional view along the line IV—IV of FIG. 1 on a smaller scale.

As apparent from the sectional view shown in FIGS. 3 and 4, the central area 23 of the pressure membrane 6 is attached to the movable pressure plates 9.

As can further be seen from these figures, consumables 25, which are connected to the sealing lips 21 in such a way that they can be replaced, are provided at the contact surface 24 between the sealing lips 21 and the filter belt 10.

The sealing lips 21 enclosing the slurry chamber 2 on the pressure membrane 6, which is in the form of a rubber cover 26, are pre-tensioned in the direction of the filter belt 10 by means of springs 27, with the result that the sealing lips 21 are already flush against the filter belt 10 such as to form a seal prior to the pressure stroke of the press. The springs 27 are braced against the movable pressure plates 9 in such a way that when the pressure stroke of the chamber filter press 1 is actuated, the sealing pressure caused by the sealing lips 21 against the filter belt 10 is simultaneously increased.

As illustrated in detail in FIG. 6, to which closer reference is made below to describe the procedure according to the invention, the stationary pressure plates 8 are connected to the movable pressure plates 9 by means of the hydraulic high-pressure generators 22 to form enclosed frames 52, and the hydraulic high-pressure generators are in the form of double cylinders 28 in the preferred embodiment.

Located in each these double cylinders 28 is a piston 29 which is connected via a piston rod 30 to the end of a movable pressure plate 9. An equivalent design is provided on the opposite lateral end of each movable pressure plate 9. The piston 29 in the double cylinder 28 serves as a plunger to provide the pressure stroke for the chamber filter press 1. Each double cylinder 28 is further provided with a second piston 31 which is connected via a piston rod 32 to a lateral end of each fixed pressure plate 8. The piston 31 serves as a closing piston and moves the movable pressure plate 9 sufficiently far downwards independently of the pressure stroke in order to ensure that the sealing lip 21 is flush against the filter belt 10 so as to form a seal.

Figure 2:
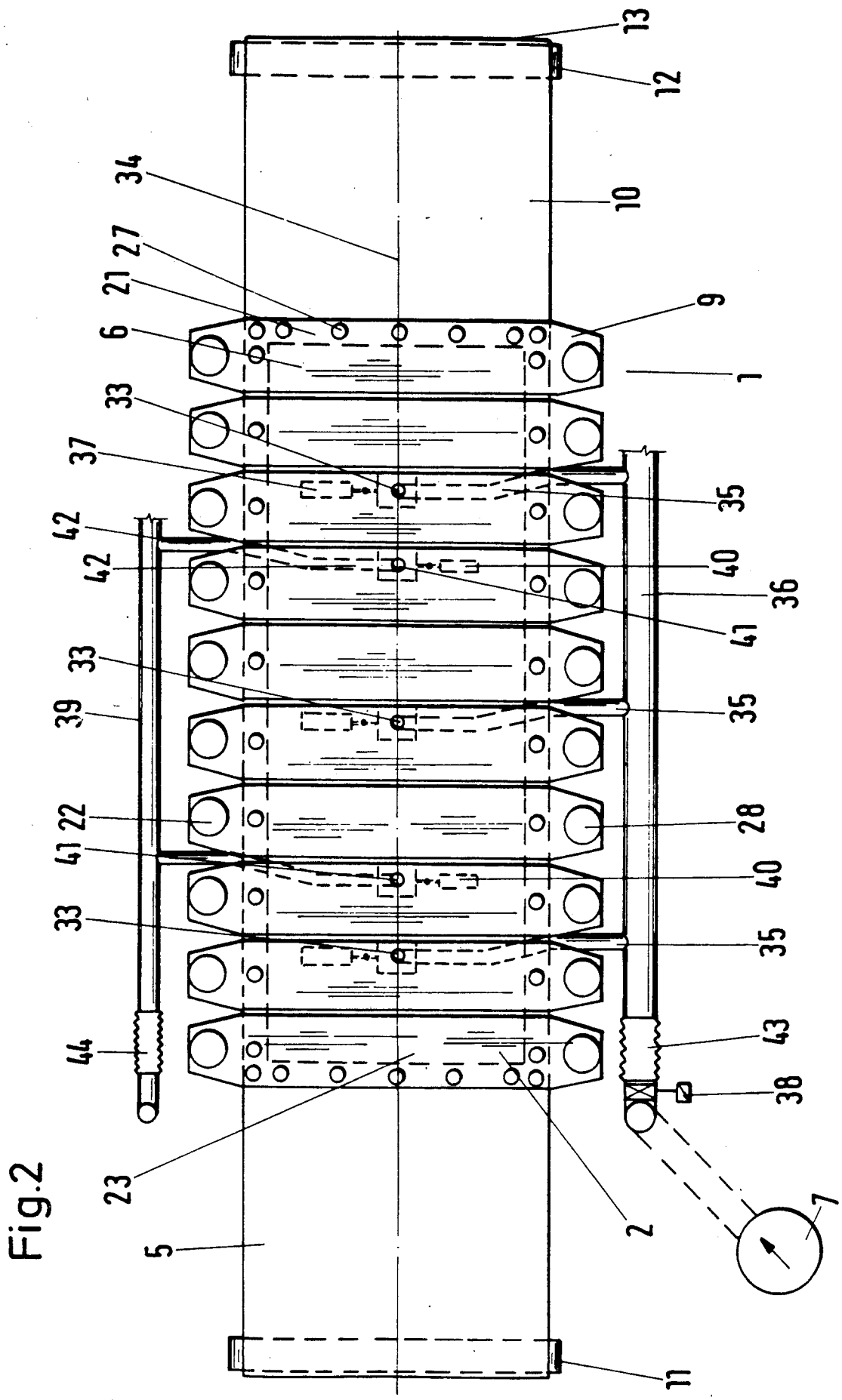
FIG. 2 shows a plan view of the chamber filter press as illustrated in FIG. 1 on a smaller scale.

As can be seen particularly from the plan view in FIG. 2, the slurry chamber 2 comprises a plurality of slurry inlets 33 which are preferably located on the centre line 34 of the pressure membrane 6. Each of the slurry inlets 33 is connected via a connecting pipe 35 to a collecting pipe 36 which is located laterally outside the slurry chamber 2. Each of the slurry inlets 33 is provided with locking valves 37 which can be actuated electrically or hydraulically. At the end leading to the pump 7, the collecting pipe 36 comprises a non-return valve 38 which can also be actuated electrically or hydraulically.

On the opposite side of the slurry chamber 2 is provided a pipe 39, which comprises in the pressure membrane 6 a plurality of outlets 41 controlled by valves 40. The outlets 41 are connected to the pipe 39 via connecting pipes 42.

Since the outlets 41 and the slurry inlets 33 are located in the pressure membrane 6, it is expedient to mount the pipe 39 and the collecting pipe 36 on the movable pressure plates depending on the stroke. The connection between the collecting pipe 36 and the pump 7 and the connection between the pipe 39 and a feed (not shown) for a washing or cleaning medium is thus best provided by bellows 43, 44, which enable the pipes to move vertically relative to the appropriate connection points.

As can further be seen from FIGS. 3 and 4, the filter belt 10 is mounted in the slurry chamber 2 on a plate 45 which is located between the filter belt 10 and the lower pressure plates 8. The plate 45 comprises upward-opening filtrate channels 46, by means of which the filtrate is removed from the press. A filtrate collection reservoir 47 is provided to collect the filtrate.

Since the slurry cake 48 is removed after the compression process and, if necessary, after washing, by advancing the filter belt 10, as a result of which a fresh filter belt section is transported into the slurry chamber, it is preferred that the plate 45 be manufactured from a low-friction plastic.

The chamber filter press described above is operated as follows:

It is assumed that the chamber filter press is empty initially, i.e. that a fresh section of the filter belt 10 is located in the slurry chamber 2. Then the closing pistons 31 are actuated, so that as a result of the pressure of the springs 27, the sealing lip 21 completely seals the slurry chamber 2 so that this is formed between the filter belt 10 and the pressure membrane 6. After this, the slurry which is to be dewatered is fed in through the slurry inlets 33 by means of the pump 7 via the collecting pipe 36. In this respect, the slurry can be fed into the slurry chamber 2 at various locations. This process is continued, for example, up to a pressure of 5 bar created hydrostatically by the pump 7 until a compressible cake is produced in the slurry chamber as a result of the dewatering process which is hereby induced. Once this adjustable hydrostatic pressure has been attained, the locking valves 37 and the non-return valve 38 are closed, with the result that the slurry chamber 2 is isolated from the pump 7. The pistons 29 are subsequently pressurised hydraulically, and a pressure is produced within the slurry chamber 2, depending on the substance to be dewatered, by advancing the movable pressure plates 9 towards the fixed pressure plates 8. In view of the design, which pressure can be of any desired feasible strength and can be maintained for desired periods of time depending on the characteristics of the substances to be dewatered without substantial effort or expense.

Once the desired degree of dewatering has been attained, the chamber filter press 1 can either be opened completely and the slurry cake 48 advanced out of the slurry chamber 2 by actuating the drive of the filter belt 10 and removed at the discharge 13, or—as illustrated in FIG. 4, for example—the slurry cake 48 can also be washed and dried following the compression process.

In this case, the plungers 29 are deactivated, and the pressure membrane 6 is raised relative to the slurry cake by moving the movable pressure plates 9 upwards, whereby the sealing link between the enclosing sealing lip 21 and the filter belt 10 is maintained. A washing or cleaning medium is then introduced into the slurry chamber 2 via the pipe 39 by opening the valves 40, and, if necessary, the slurry cake 48 is compressed once more by actuation of the plungers 29. If required, a further drying process can follow by introducing compressed air or similar through the pipe 39.

Reference is made below to the embodiments in accordance with FIGS. 5 to 7.

As shown, this particularly preferred embodiment of the invention comprises a plurality of—in the embodiment exemplified here: three—chamber filter presses 1 A, B, C, configured parallel to one another, which can be operated simultaneously but in an alternating cycle.

Figure 7:
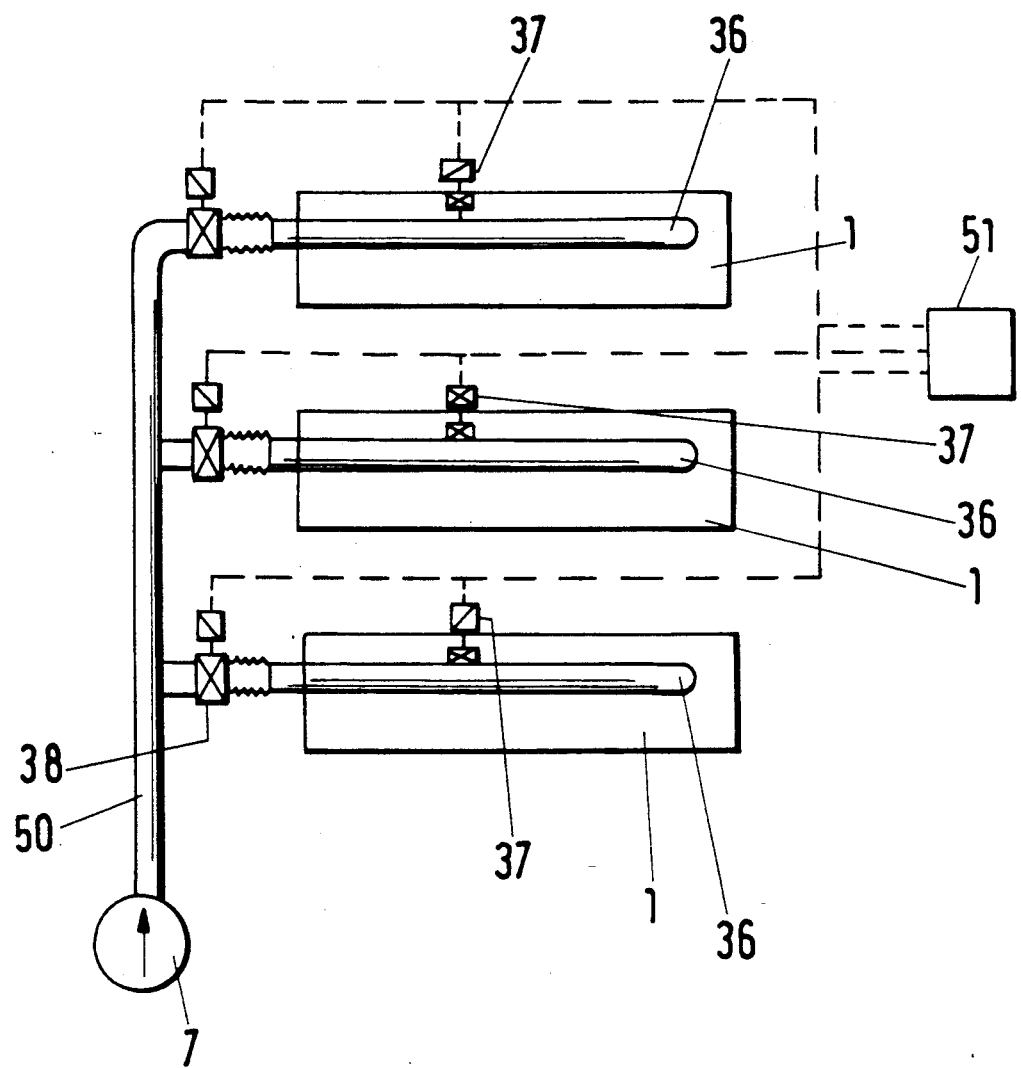
FIG. 7 shows a diagrammatic representation of the control system for the embodiment according to FIGS. 5 and 6.
Figure 8:
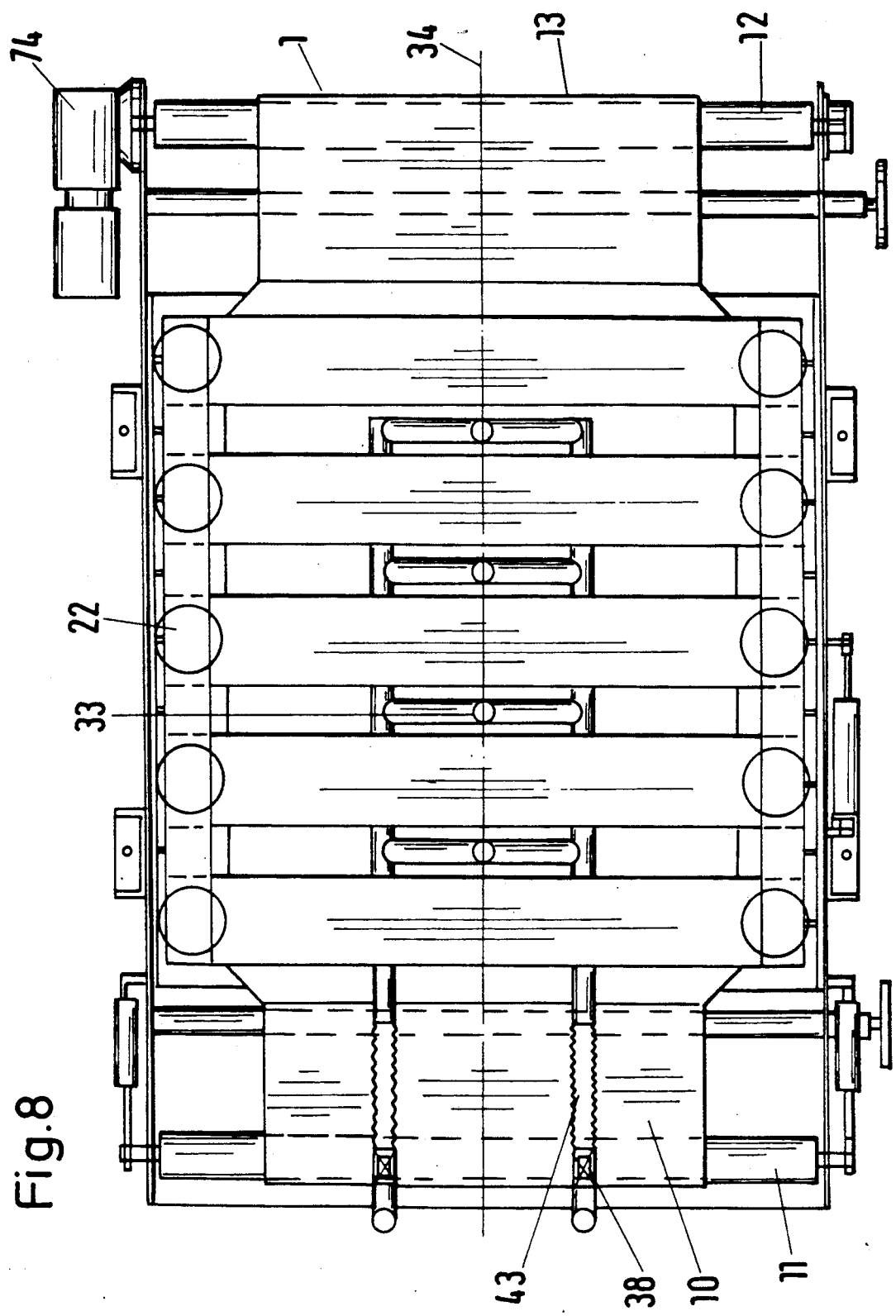
FIG. 8 shows a diagrammatic plan view of an embodiment according to the invention in which the slurry chamber sealing system is provided with a separate drive.

As shown in highly diagrammatic form in FIG. 7, the chamber filter presses 1A to 1C are connected by means of their collecting pipes 36 to a main pipe 50, which is maintained under continuous pressure by the pump 7. A control system 51 is provided which controls the non-return valves 38, the locking valves 37, the high-pressure generators 22 and the drive of the filter belt 10 in accordance with the working cycle of the individual chamber filter presses 1A to 1C such that the sludge feed and the discharge of the slurry cake 48 proceed more or less continuously, though from different slurry chambers 2.

Figure 6:
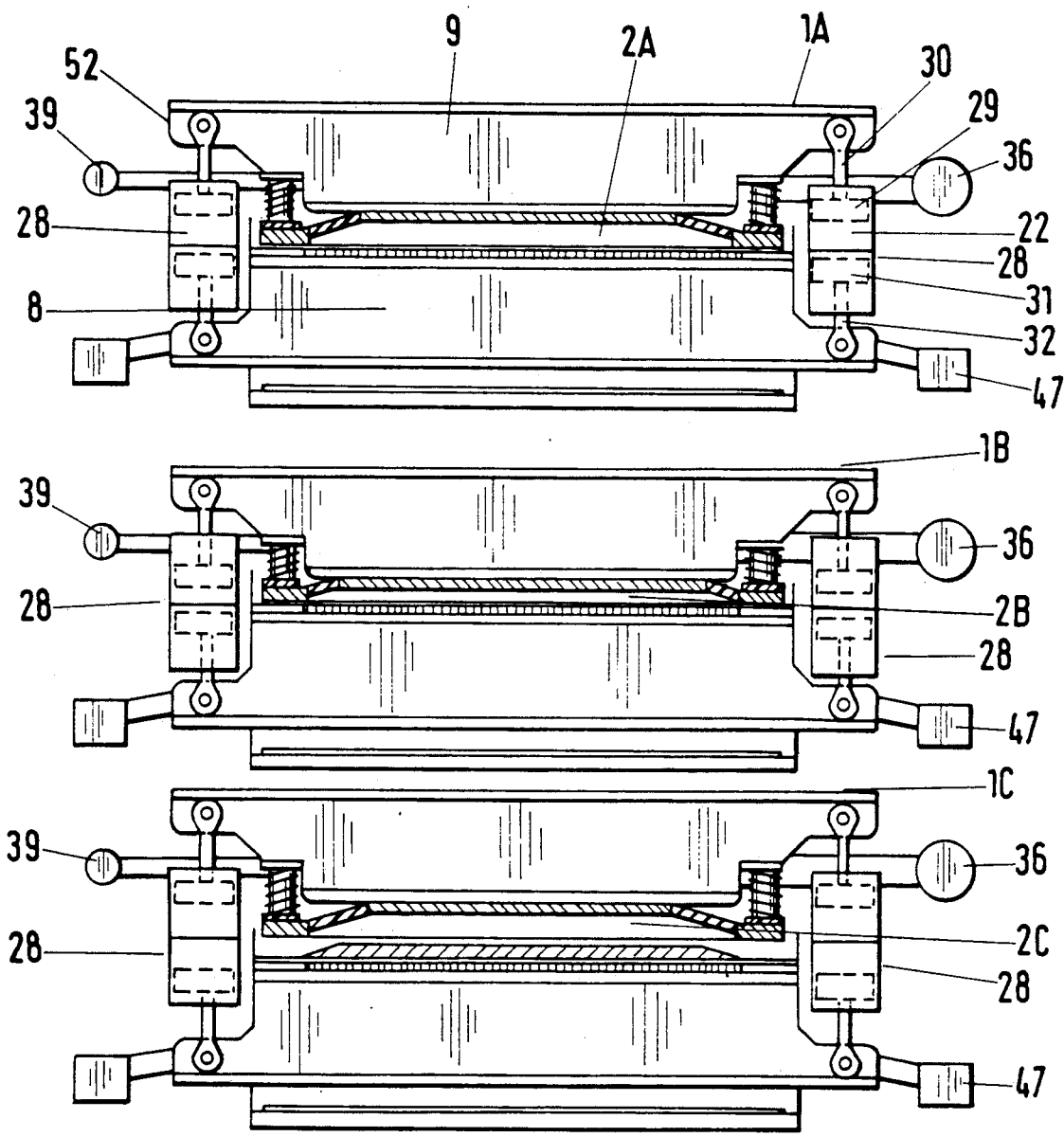
FIG. 6 shows a cross-sectional view along the line VI—VI of FIG. 5.

FIGS. 5 and 6 represent practically an instantaneous image from this process. The slurry chamber 2A is just being filled with slurry, and the hydrostatic pressure is just being produced in the slurry chamber 2A for which the locking valves 37 and the non-return valve 38 are open. The chamber filter press IB is simultaneously carrying out its compression stroke by actuating the high-pressure generators 22 for which the locking valves 37 and the non-return valves 38 are closed. Furthermore, the chamber filter press 1C is also simultaneously open, and the slurry cake 48 is being removed by advancing the filter belt 10 for which the locking valves 37 and the non-return valve 38 are still closed. At this stage, therefore, only the locking valves 37 and the non-return valve 38 of chamber filter press IA are open, and this is in the process of being pressurised with hydrostatic pressure by the continuously running pump 7. Once this pressure in chamber filter press 1A has attained the set level, the valves 37 and 38 are closed, and the chamber filter press IA begins its compression stroke by actuation of the pistons 22. The chamber filter press 1B simultaneously opens to discharge the slurry cake 48, while refilling of the now empty chamber filter press 1C can begin once the press has been closed by actuation of the closing piston 31, by opening the valves 37 and 39, such that the pressure which is permanently present in the main pipe 50 begins to act on the chamber filter press 1C.

A particularly preferred embodiment of the chamber filter press 1 is described below with reference to FIGS. 8 to 16 and 19 and, further below, with reference to FIGS. 17 and 18. The embodiment illustrated in these figures is identical to the embodiment described with reference to FIGS. 1 to 7 in respect of the essential components and its fundamental mode of operation, and thus reference can be made to the above description in respect of these details, because of the utilisation of the same designations for components which are the same or have the same effect.

The features of the embodiment described in FIGS. 8 to 19 which diverge from those of the embodiments described previously are, firstly, the type of seal between the pressure membrane 6 and the filter surface 5 and, secondly, the particular design of the guide system at the edge of the slurry chamber 2. It is self-evident that this guide system, which is described in greater detail at a later stage, can also be used for the embodiment in accordance with FIGS. 1 to 7.

Figure 9:
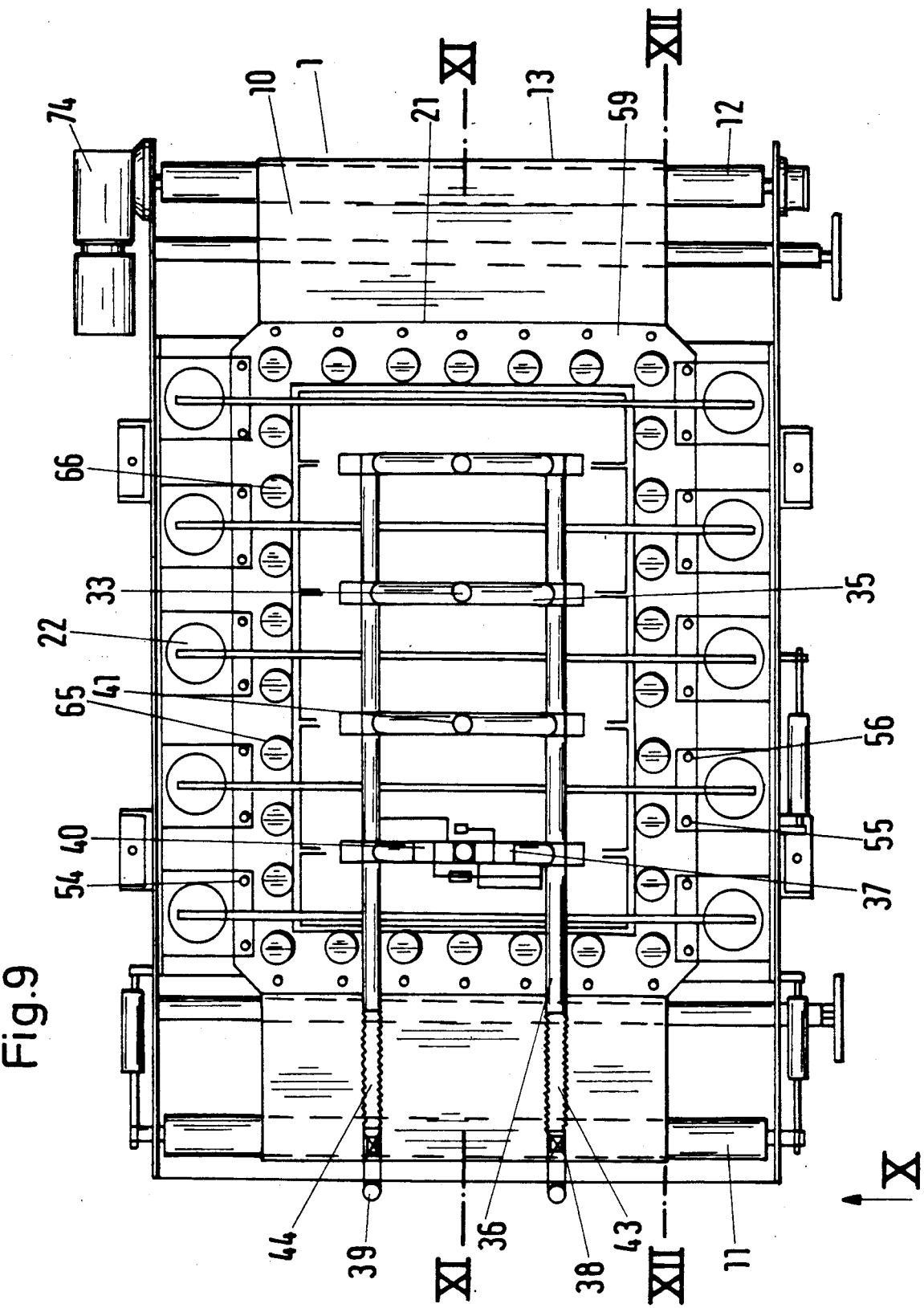
FIG. 9 shows a plan view, partially in section, of the chamber filter press according to FIG. 8, where the sectional plane runs approximately along the line IX—IX of FIG. 11.
Figure 10:
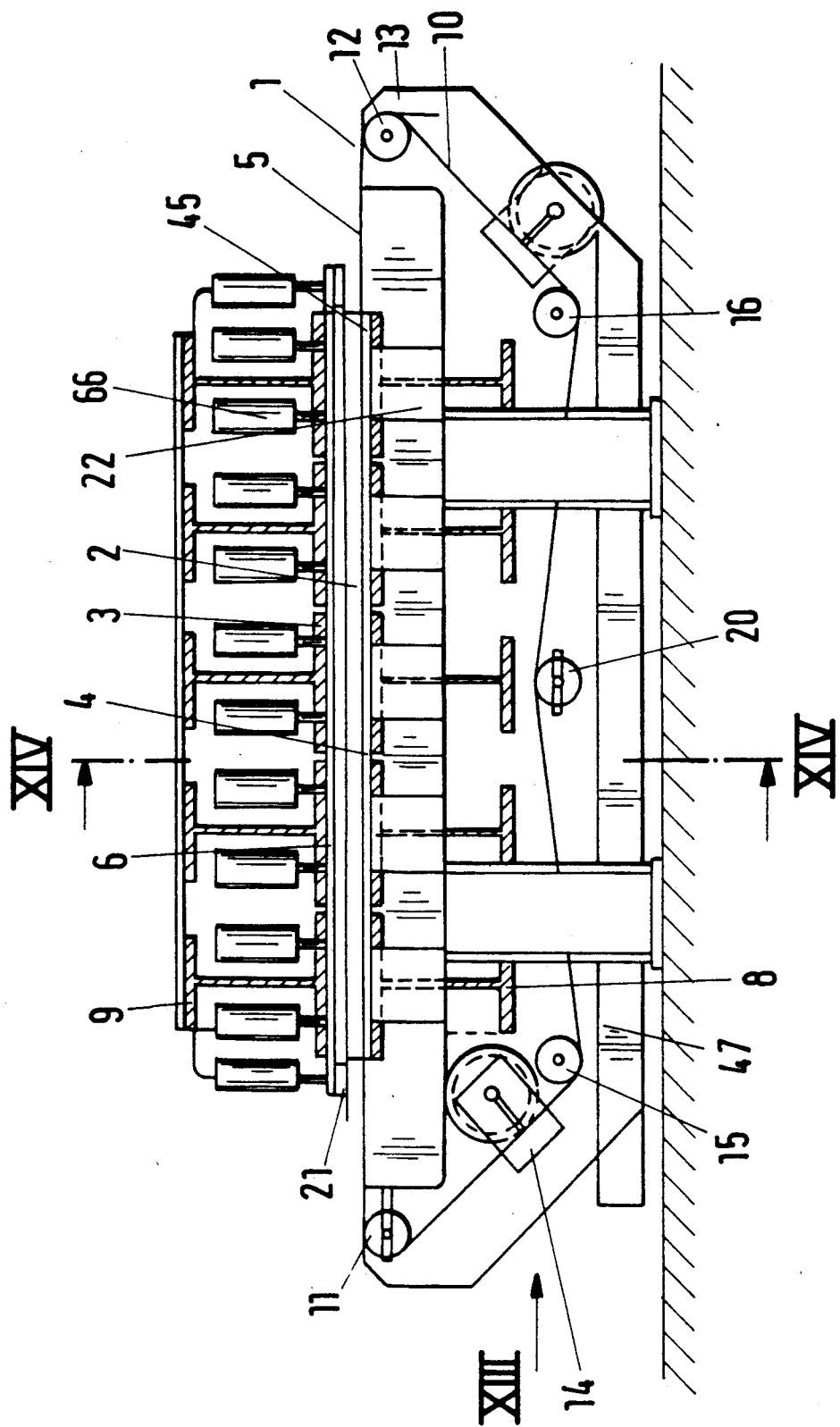
FIG. 10 shows a side view of the chamber filter press in a highly diagrammatic representation in the direction of the arrow X in FIG. 9.
Figure 19:
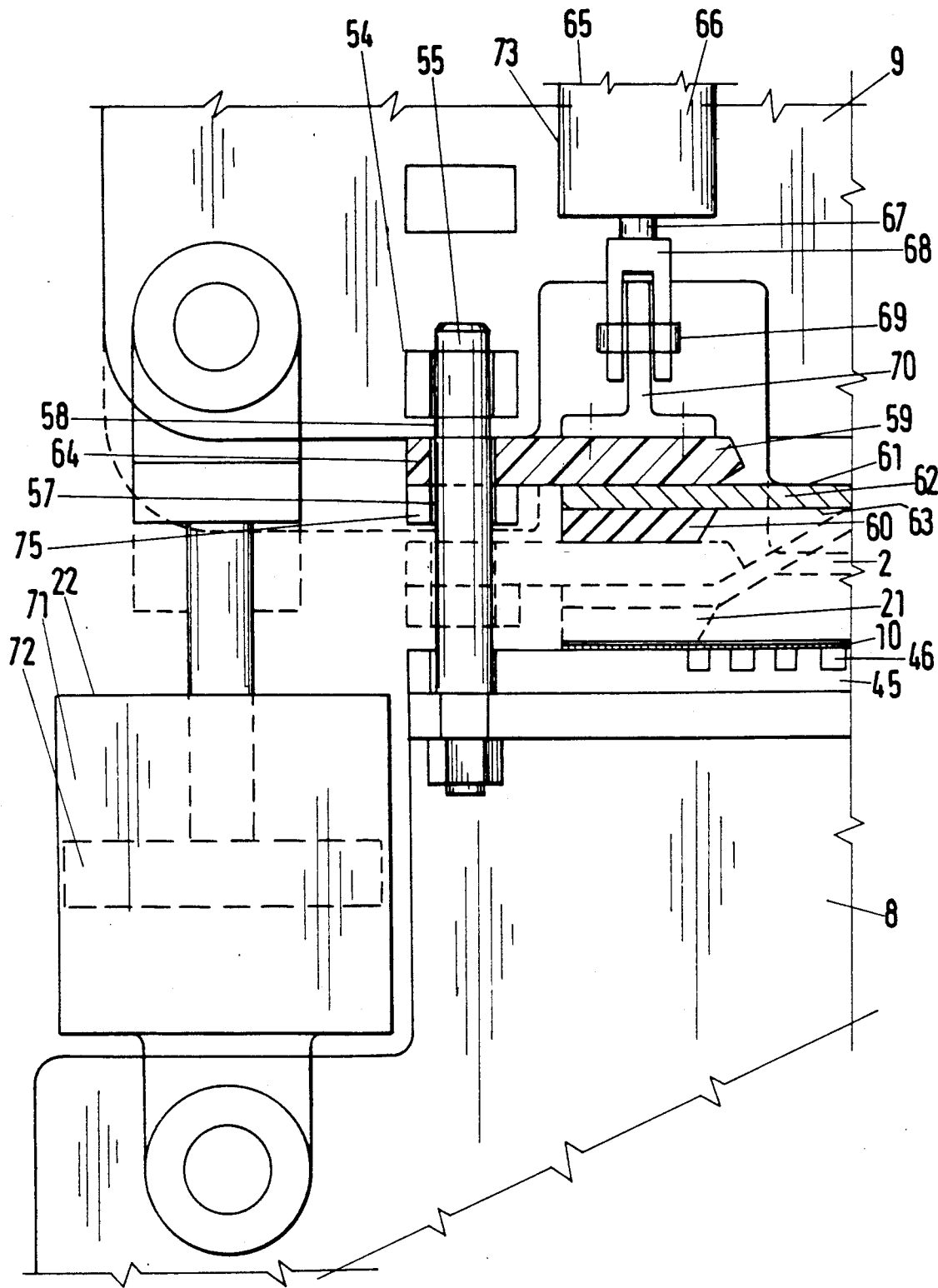
FIG. 19 shows a sectional view of an outer edge zone of the slurry chamber, illustrating details of the drive of the sealing lips in accordance with the embodiment as shown in FIGS. 8 to 17.

Reference is first made to FIGS. 9 and 19 in respect of the design of the guide system at the edges of the slurry chamber 2.

As shown, guides designated 54 overall are provided in this embodiment for the movable pressure plates 9 and the sealing lips 21, where said guides guide the vertical motion of the pressure membrane 6 in the form of a rubber cover 26 and the vertical motion of the movable pressure plates 9.

The guides 54 for the movable pressure plates 9 and the sealing lips 21 are in the form of common guides, since the pressure plates 9 and the sealing lips 21 move in the same direction.

The guides 54 comprise vertical spigots 55 and 56 which are attached in pairs to each end of one of the pressure plates 8 or 9 and which slide into guide bores 57 in the sealing lips 21 and guide bores 58 in the other pressure plate 8 or 9 as appropriate. In the embodiment exemplified here, the spigots 55 and 56 are attached to the lower fixed pressure plates, and the guide bores 58 are formed in the upper movable pressure plates 9.

As can be seen from FIG. 9, a number of guides 54 are also provided at equal regular intervals on the two end faces of the slurry chamber 2, where said guides also consist of pairs of spigots 55 and 56.

Since the pressure membrane 6 is preferably in the form of a rubber cover 26, the sealing lips 21 are designed in such a way that a sliding guide system of this type is possible in order to improve the guide process in a vertical direction.

To this end, the sealing lips 21 consist of a rigid reinforcement strip 59 made of plastic or a similar material, where said reinforcement strip 59 can either be formed as a frame surrounding the pressure membrane 6 or can comprise a plurality of individual components.

In addition, the sealing lips 21 consist of a sealing element 60 made of a flexible material enclosing the periphery of the pressure membrane 6, where the reinforcement strip 59 is attached to the upper face 61 of the edge zone 62 of the pressure membrane 6, and the sealing element 60 opposite the reinforcement strip 59 is attached to the lower face 63 of the end zone 62 of the pressure membrane 6.

As can be seen from FIG. 19, the reinforcement strip 59 is stuck or welded to the upper face of the rubber cover 26 which forms the pressure membrane 6, while the sealing element 60, supported by the opposing reinforcement strip 59, is welded or stuck to the opposite side of the rubber cover 26, i.e. the side facing the filter surface 5.

As can be seen from FIG. 9, the sealing lip 21 incorporates an edge 64 which protrudes beyond the periphery of the pressure membrane 6, in which edge the guide bores 57 are located. On the underside of the protruding edge 64 in the region of the guide bores 57, further individual reinforcements 75 are provided, so that, during the upward and downward movement of the edge zone 62 of the pressure membrane 6 as described in greater detail further below, the guide system consists, as it were, of a plastic bush made of the same material as the reinforcement strip 59 and the reinforcement 75 sliding over the spigots 55 and 56.

The other essential feature of the embodiment described with reference to FIGS. 8 to 19 which differs from the embodiment according to FIGS. 1 to 7, i.e. the separate drive 73 for the sealing lips 21, is described in detail with particular reference to FIGS. 9 to 16 and 19.

As shown, this particularly preferred embodiment for the sealing lips 21 comprises a separate drive designated 73 overall, by means of which the sealing lips 21 are positively controlled and can be moved up and down.

The drive 73 is formed by a number of controllable pressure generators 65 located on the sealing lips 21, where said pressure generators 65, as shown in particular in FIG. 9, are distributed at regular intervals around the periphery of the pressure membrane 6 above the sealing lips 21. The pressure generators 65 enable the sealing lips 21 to be pressed down relative to the upper pressure plate 9, i.e. independently of its movement in the direction of the filter belt 10 and raised away from the latter.

In the preferred embodiment exemplified, the pressure generators 65 are in the form of pneumatic cylinders 66 which can be actuated to open and close the slurry chamber 2 by raising and lowering the sealing lips 21.

The pneumatic cylinders are braced against the upper pressure plates 9 and move together with the latter. The configuration in this respect is chosen such that the pressure is increased during the compression stroke of the upper pressure plates 9 by compression of the residual air in the individual pneumatic cylinders 66 after the sealing lips 21 have been lowered on to the filter belt 10. Consequently, as the pressure in the slurry chamber 2 increases, so the pressure with which this is sealed increases simultaneously.

As shown, two pneumatic cylinders 66 are provided at each end of an upper pressure plate 9, and an appropriate number of pneumatic cylinders 66 are distributed at regular intervals over the length of the two pressure plates 9 which form the face ends of the slurry chamber 2.

As can be seen in FIG. 19 in particular, the piston rods 67 of the pneumatic cylinders 66 are connected to the reinforcement strip 59 of the sealing lip by an articulated joint by having a fork located at the free end of the piston rod 67 of each pneumatic cylinder 66, which fork, by means of a hinge pin 69 and appropriate bores, accommodates the vertical arm of a T-piece 70, which is attached to the upper face of the reinforcement strip 59. The configuration in this respect is selected in such a way that the piston rod 67 matches the centre line of the sealing element 60 so that optimum pressure distribution is achieved when the sealing element 60 is pressed together.

Because of this configuration, the sealing lip 21 can therefore be moved upwards and downwards independently of the upper pressure plate 9, and in FIG. 19 the broken lines indicate the position when lowered, in which the slurry chamber 2 is sealed. The advantages of this configuration over the first embodiment exemplified are, firstly, that the stroke of the hydraulic pressure generators is halved, since, as can be seen in FIG. 19, the rubber cover 26 of the pressure membrane 6 can be moved into a completely straight position by means of the pneumatic cylinder 66 and, secondly, that a separate closing cylinder is not required for the hydraulic high-pressure generators 22, with the result that the hydraulic high-pressure generators, as illustrated in FIG. 19, can be manufactured in the form of single cylinders 71 which contain only a plunger 72 which can move upwards and downwards.

The operation of this embodiment is described briefly below with reference to FIGS. 11 and 12 and 14 to 16.

It is again assumed that the slurry chamber 2 is empty, i.e. that a fresh section of the filter belt 10 has been advanced into the slurry chamber.

Figure 11:
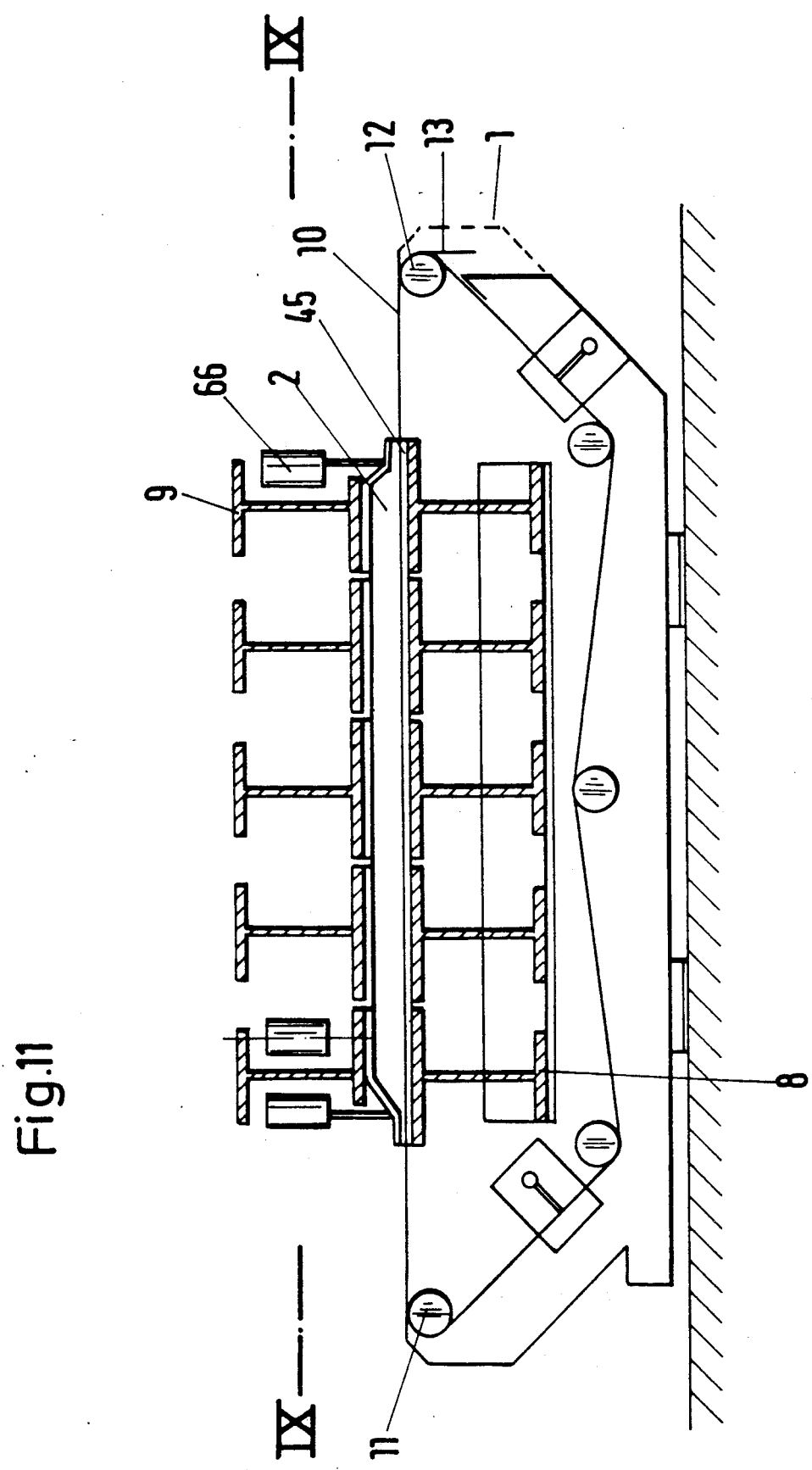
FIG. 11 shows a sectional view along the line XI—XI in FIG. 9.
Figure 14:
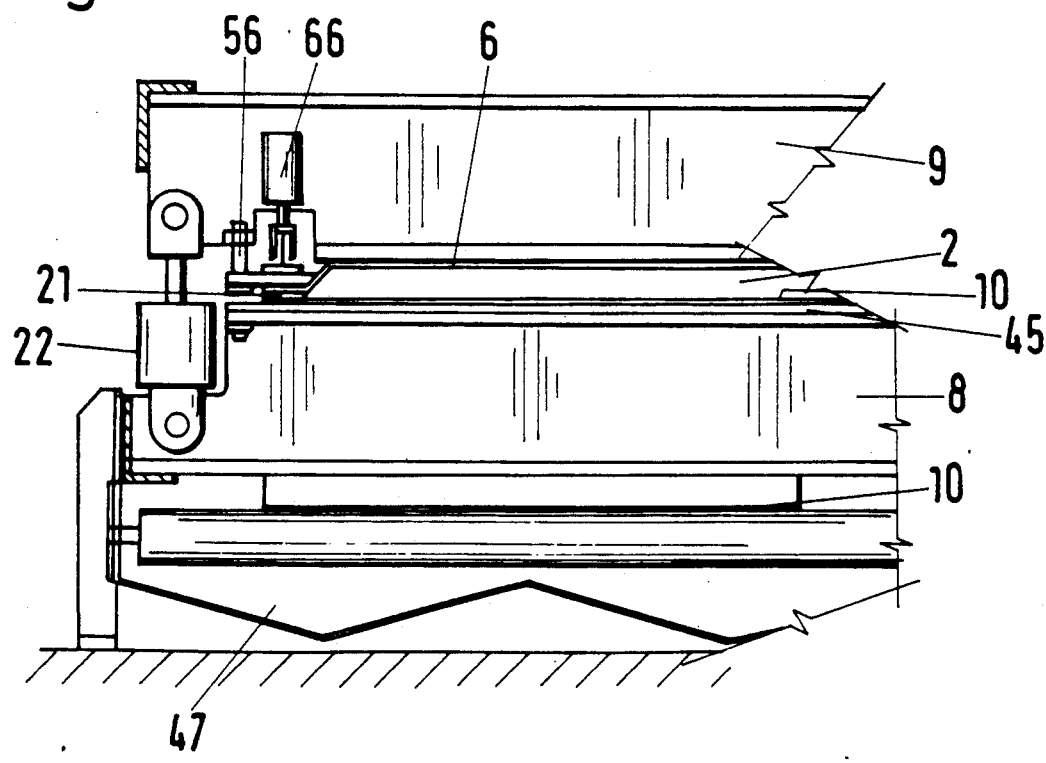
FIG. 14 shows a side view along the line XIV—XIV in FIG. 10, where the chamber filter press is illustrated during loading and generation of the pump pressure.

Once this is the case, the pneumatic cylinders 66 are first pressurised with compressed air so that the sealing lips 21 form a seal with the filter belt 10, and the slurry chamber 2 is tightly sealed all round. Then the slurry to be dewatered is fed in through the slurry inlets 33 by means of the pump 7 via the collecting pipe 36. In this respect, the slurry can be fed in through the four slurry inlets 33 shown in FIG. 9 in order to achieve better distribution. As with the first embodiment exemplified, this process is continued, for example up to a pressure of 7 bar created hydrostatically by the pump 7 until a compressible slurry cake 48 is produced as a result of the dewatering process which is hereby induced. The state in which infeed and the generation of the hydrostatic pressure occur is illustrated in FIGS. 11 and 14.

Figure 15:
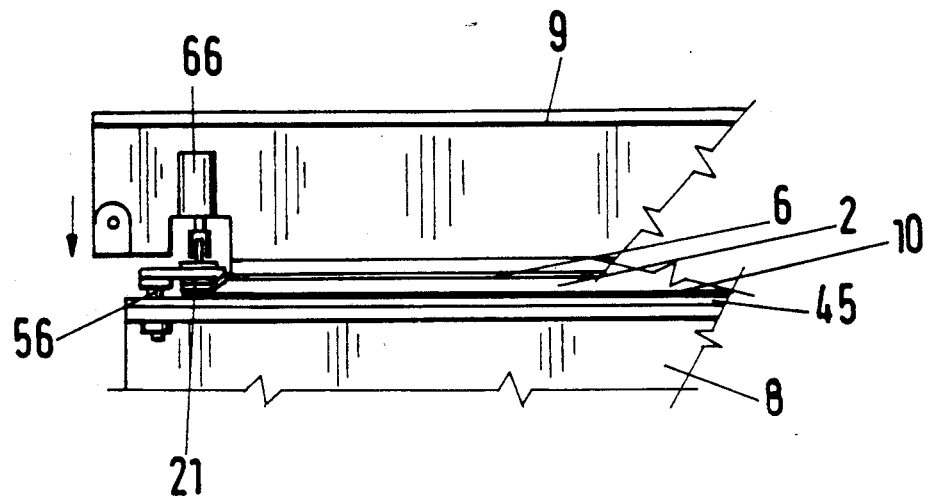
FIG. 15 shows a view corresponding to FIG. 14 where, however, only part of FIG. 14 is shown and where the chamber filter press is shown in the state in which the pressure is generated by the movable pressure plates.

Once this adjustable hydrostatic pressure has been attained, the locking valves 37 and the non-return valve 38 are closed, with the result that the slurry chamber 2 is isolated from the pump 7. The plungers 72 are subsequently pressurised hydraulically for a downward movement, and by movement of the movable pressure plates 9 towards the fixed pressure plates 8 a mechanical pressure is exerted on the slurry cake 48 in the slurry chamber 2, where said slurry cake 48, as in the first embodiment exemplified, can be of any desired feasible height and can be left for desired periods of time depending on the characteristics of the substances to be dewatered, without substantial expense. This state is illustrated in FIG. 15 in the drawings, although only a part of the edge of the slurry chamber 2 is shown with the pneumatic cylinders 66 which close the slurry chamber 2 by means of the sealing lips 21.

During the downward motion of the movable pressure plates 9 towards the fixed pressure plates 8, the air in the pneumatic cylinders 66 is compressed, because, as a result of the downward motion of the movable pressure plates 9, the piston rods 67 of the pneumatic cylinders 66 are forced into the cylinders. Consequently, the pressure exerted by the sealing lips 21 is considerably increased.

Figure 16:
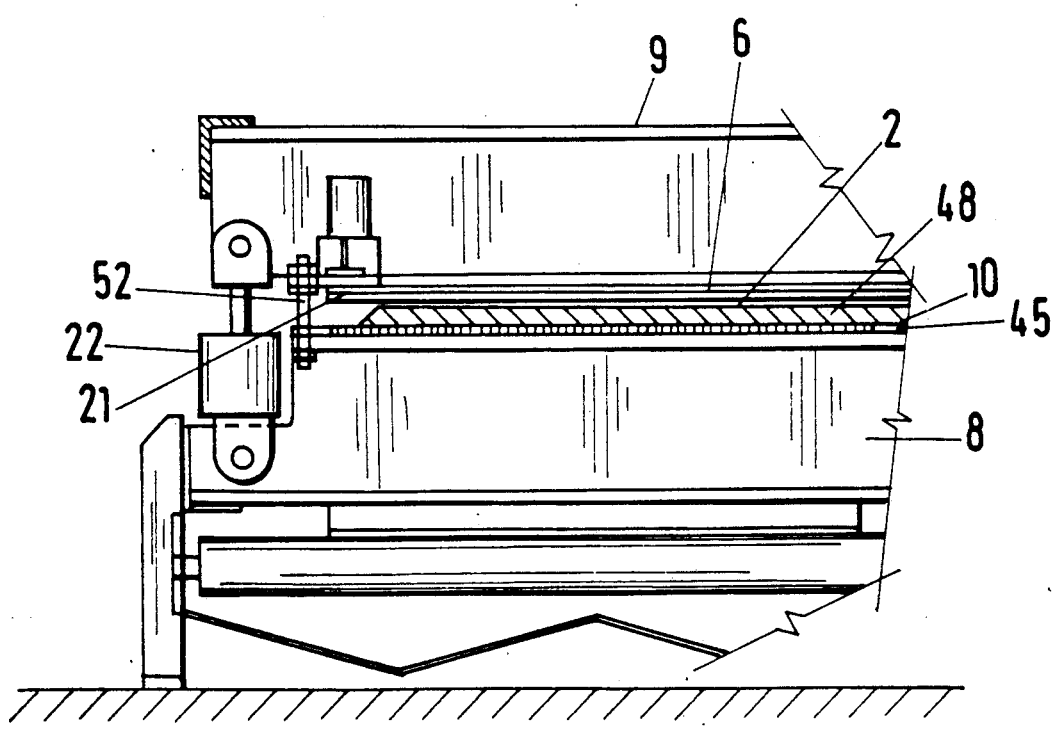
FIG. 16 shows a view corresponding to FIG. 14 during the discharge of the slurry mat from the chamber filter press once the pressing process is complete.

Once the desired degree of dewatering has been attained, the plungers 72 are first deactivated and at the same time, the pneumatic cylinders 66 are retracted so that the pressure membrane assumes a flat shape as illustrated in FIG. 16. If the gap between the pressure plate pairs 8 and 9 is now opened slightly, the discharge of the slurry cake 48 can be initiated. This state is illustrated in FIGS. 12 and 16.

Should it be necessary to wash the slurry cake again, instead of simultaneously retracting the pneumatic cylinders 66 the plungers 72 are merely deactivated and moved to the open position by appropriate reversing. A washing or cleaning medium can subsequently be introduced into the slurry chamber 2 via the pipe 39, by opening the valves 40, and, if necessary, the slurry cake 48 can be compressed again by actuation of the plungers 72.

Figure 12:
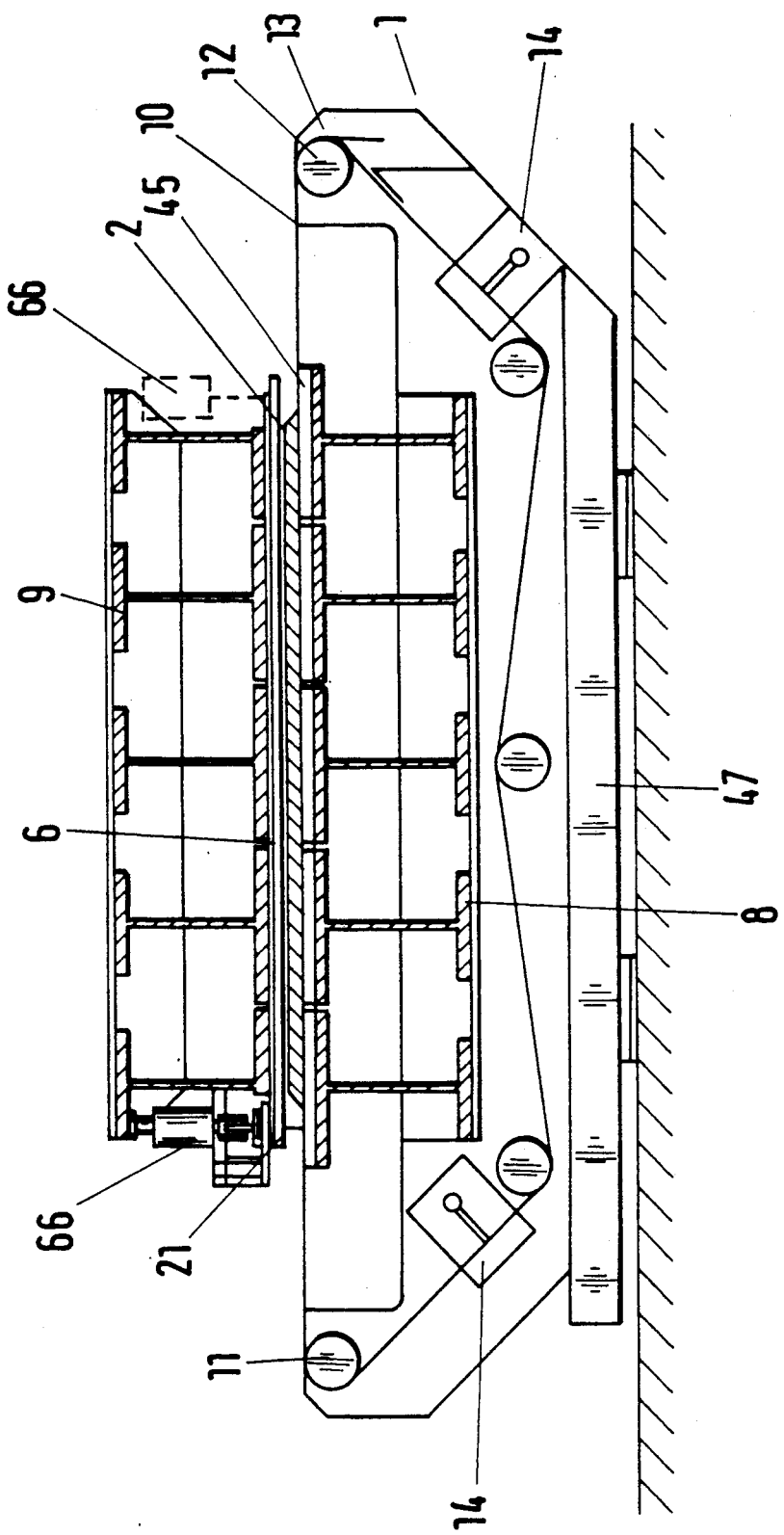
FIG. 12 shows a sectional view along the line XII—XII in FIG. 9.
Figure 13:
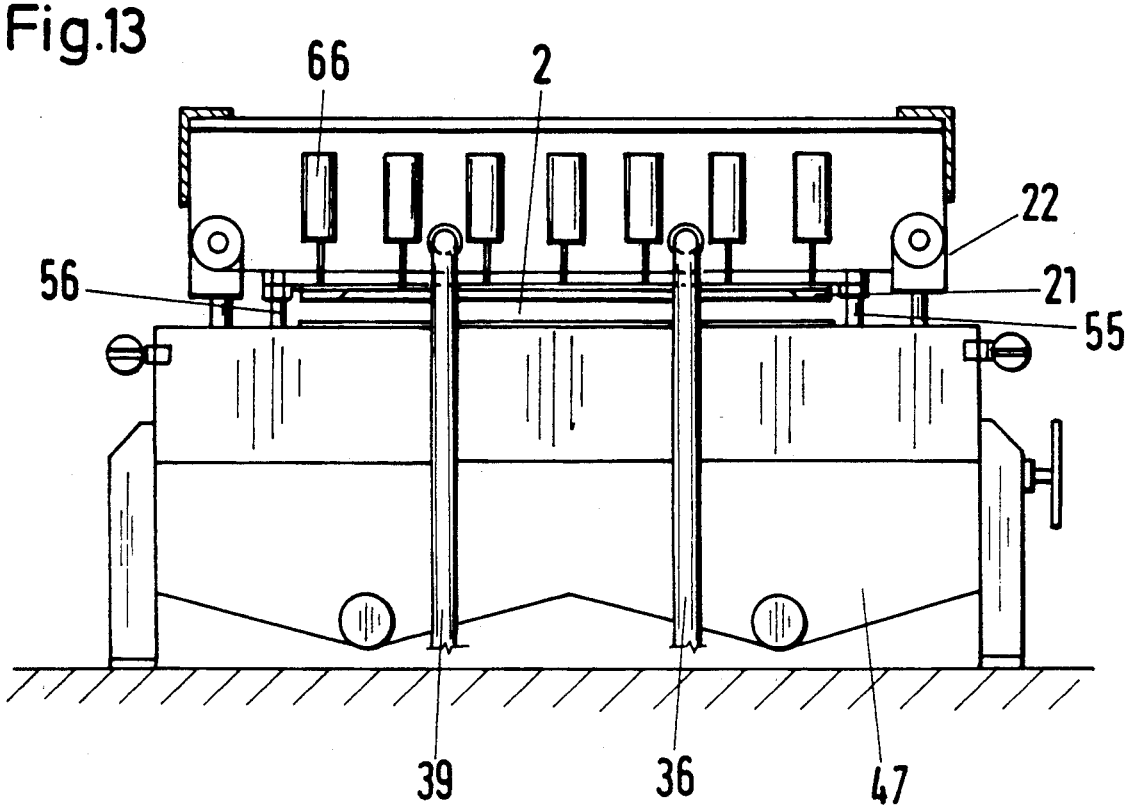
FIG. 13 shows a view of the chamber filter press in the direction of the arrow XIII in FIG. 10.

Whichever sequence is followed, once the slurry chamber 2 has been completely opened, as illustrated in FIGS. 12 and 16, the filter belt is advanced via its drive 74 so that the slurry cake 48 is transported out of the slurry chamber 2 and removed at the discharge 13. During this process, a fresh section of the filter belt 10 is advanced into the slurry chamber 2 so that the procedure can be repeated.

Figure 17:
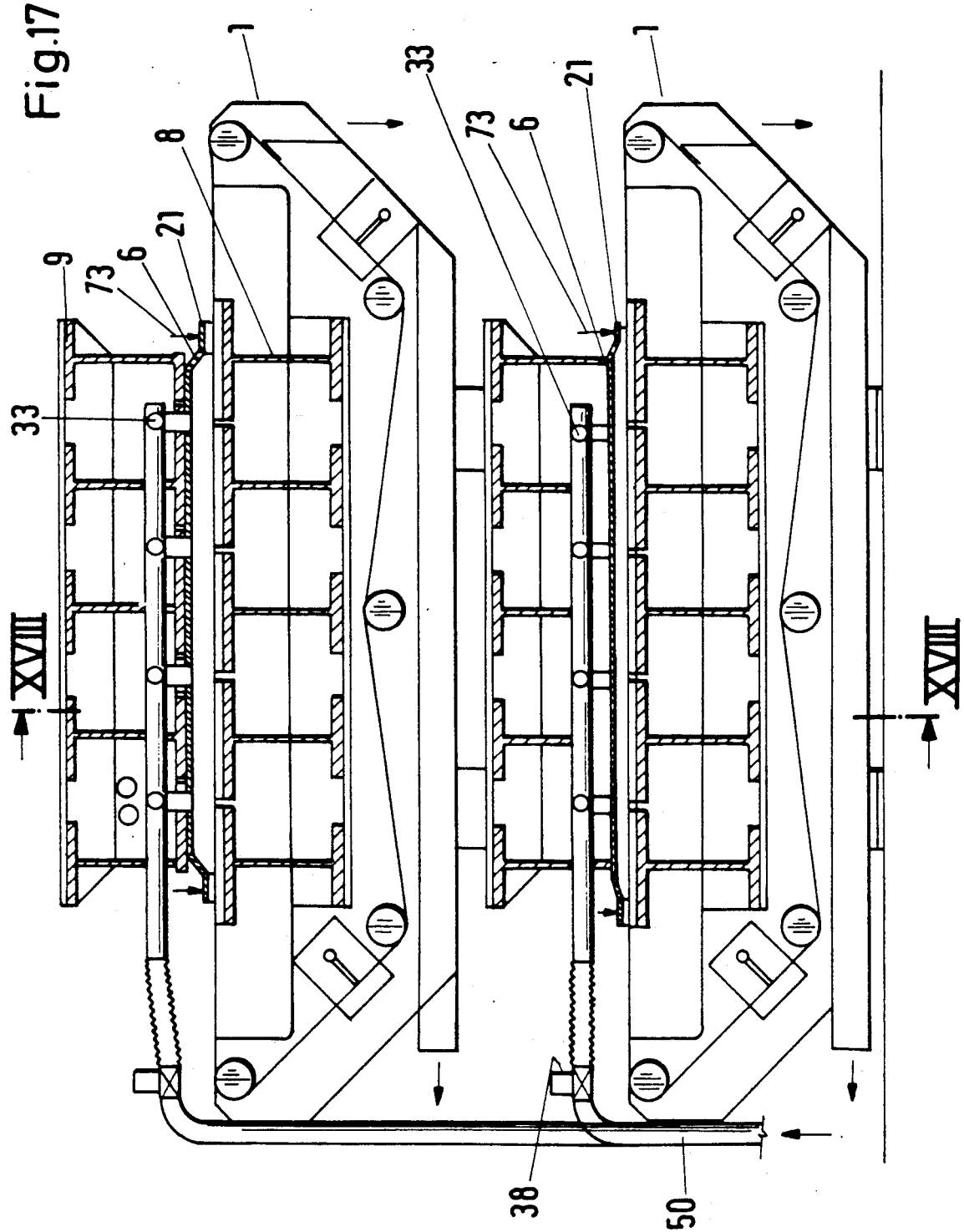
FIG. 17 shows a lateral diagrammatic sectional view of a configuration comprising two chamber filter presses located vertically above one another according to FIGS. 8 ff.
Figure 18:
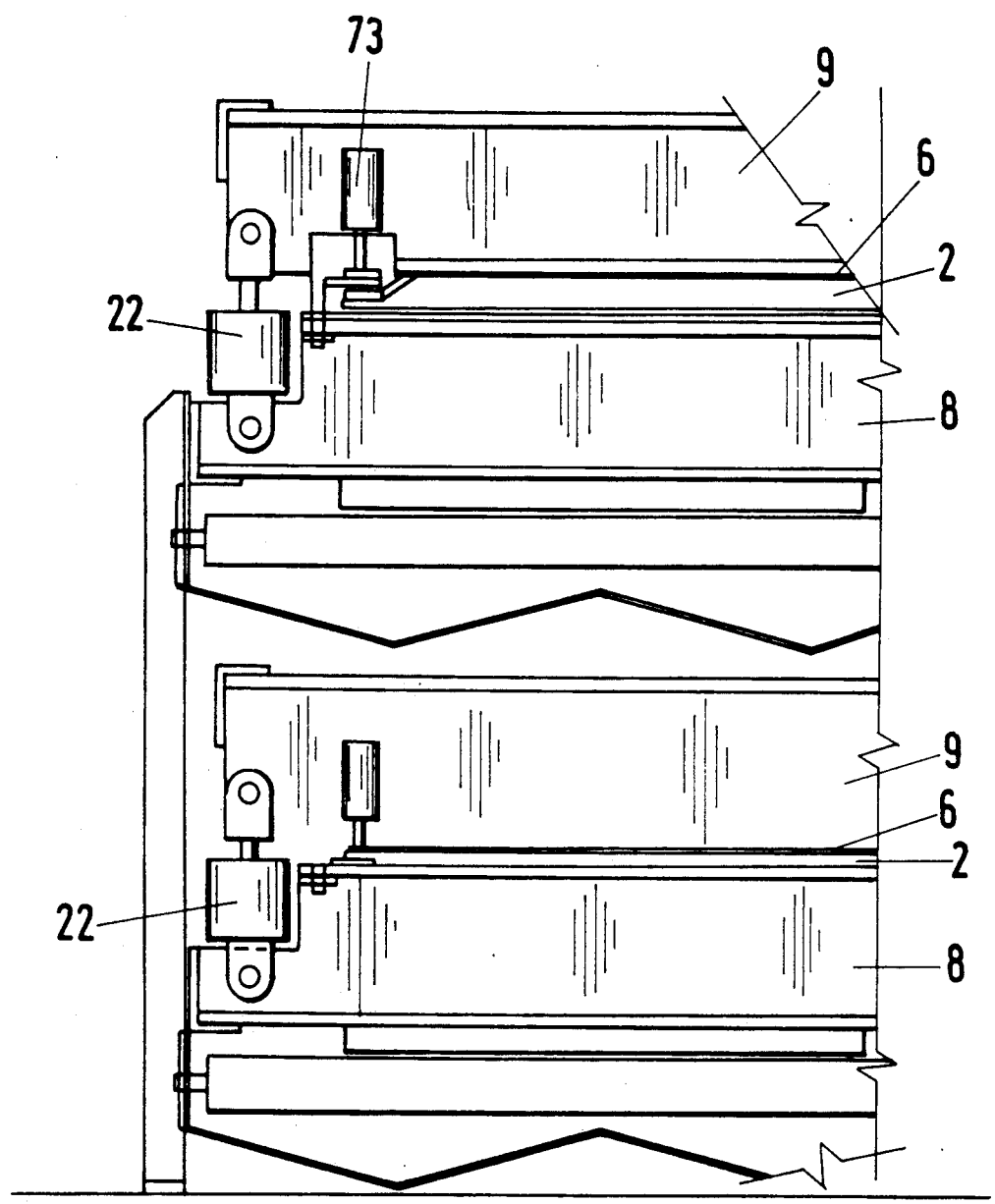
FIG. 18 shows a sectional view along the line XVIII—XVIII of FIG. 17.

FIGS. 17 and 18 show a further embodiment of the invention as is to be built for experimental purposes. As shown, this embodiment in accordance with the embodiment as per FIGS. 5 to 7 comprises two superposed chamber filter presses 1 which, as in the case of the embodiment described previously, can be operated in cycles in such a way that almost continuous operation is possible. It is preferred in this respect that a control system be employed which controls the cyclical operation of the non-return valve 38, the locking valves 37, the high-pressure generators 22, the pneumatic cylinders 66 and the drive 74 of the filter belt 10 in accordance with the working cycle of the two chamber filter presses.

It is self-evident that with a continuously running pressure pump, the infeed and discharge occur continuously but at different levels.

It is further self-evident that the chamber filter press according to the invention can either be operated discontinuously as a single unit or continuously in the manner described.

All the features and advantages of the invention proceeding from the description, claims and drawings, including design details and spatial configurations, can be characteristic of the invention both in themselves and in any desired combination.

What is claimed is:

1. A method for dewatering slurry and similar substances comprising the steps of:
   feeding the slurry by means of a pump under pressure into a slurry chamber including at least one filter surface;
   generating a hydrostatic pressure in the slurry chamber by driving the pump to induce the dewatering process;
   attaining an adjustable pressure level in the slurry chamber;
   isolating the slurry chamber from the pump;
   reducing the volume of the slurry chamber; and
   producing a mechanical dewatering pressure which is greater than the hydrostatic pressure attained.

2. The method as claimed in claim 1, further comprising the step of removing the filter surface from the slurry chamber together with the filter cake produced in order to discharge the filter cake.

3. The method as claimed in any one of claims 1 or 2, further comprising the step of simultaneously pumping the slurry into the slurry chamber at various locations.

4. Chamber filter press for performing the method steps of feeding the slurry by a pump under pressure into a slurry chamber including at least one filter surface; generating a hydrostatic pressure in the slurry chamber by the driving of the pump to induce the dewatering process; attaining an adjustable pressure level in the slurry chamber; isolating the slurry chamber from the pump; reducing the volume of the slurry chamber; and producing a mechanical dewatering pressure which is greater than the hydrostatic pressure attained, said chamber filter press comprising: at least one completely enclosed slurry chamber having filter surfaces and having a slurry inlet which is connected by a pipe to a pump generating the filtration pressure, wherein the filter surfaces (5) in the slurry chamber (2) are located between stationary and movable pressure plates (8, 9) and can be repressurized mechanically once the pump (7) has been switched off.

5. Chamber filter press as claimed in claim 4, wherein the slurry chamber (2) comprises a cover (3) containing the movable pressure plates (9) and a base (4) containing the fixed pressure plates (8), and wherein the cover (3) can be moved relative to the base (4) between an open and a closed position by means of the movable pressure plates (9).

6. Chamber filter press as claimed in any one of claims 4 or 5, wherein the slurry chamber (2) includes the filter surfaces (5) in the form of a filter belt (10) running intermittently in a horizontal plane and a straight direction and of a pressure membrane (6), and wherein the pressure membrane (6) is provided with enclosing sealing lips (21) which in the closed position lie flush with the filter belt (10) thereby forming a seal.

7. Chamber filter press as claimed in claim 6, further comprising guides (54) for the vertical movement of the movable pressure plates (9) and the sealing lips (21).

8. Chamber filter press as claimed in claim 7, wherein the guides (54) for the movable pressure plates (9) and the sealing lips (21) are in the form of common guides.

9. Chamber filter press as claimed in claim 8, wherein the guides (54) are in the form of vertical spigots (55, 56) on one of the pressure plates (8 or 9) of a pair of pressure plates, and wherein the spigots slide into guide bores (57, 58) located in the sealing lips (21) and the other pressure plate (9 or 8) as appropriate.

10. Chamber filter press as claimed in any one of claims 7 to 9, wherein the sealing lips (21) include a rigid reinforcement strip (59) made of plastic or a smaller material and a sealing element (60) made of a flexible material enclosing the periphery of the pressure membrane (6), wherein the reinforcement strip (59) is attached to the upper face (61) of the edge zone (62) of the pressure membrane (6) and the sealing element (60) of the reinforcement strip (59) is attached to the lower face (63) of the edge (62), and wherein the sealing lip (21) comprises an edge (64) which protrudes beyond the periphery of the pressure membrane (6), and that the guide bores (57) are formed in the edge (64).

11. Chamber filter press as claimed in claim 5, wherein the pressure membrane (6) is in the form of a rubber cover (26) connected to the sealing lips (21).

12. Chamber filter press as claimed in claim 5, wherein the sealing lips (21) are spring-loaded in the direction of the filter belt (10).

13. Chamber filter press as claimed in claim 12, wherein the springs (27) acting on the sealing lips (21) are supported against the movable pressure plates (9) such that during the pressure stroke, the sealing pressure is simultaneously increased.

14. Chamber filter press as claimed in claim 4, wherein the hydraulic high-pressure generators (22) connect the stationary pressure plates (8) with the movable pressure plates (9) to form enclosed frames (52).

15. Chamber filter press as claimed in claim 14, wherein the hydraulic high-pressure generators (22) are in the form of double cylinders (28).

16. Chamber filter press as claimed in claim 15, wherein each double cylinder (28) contains one piston (29) in the form of a plunger and a second 17. Chamber filter press as claimed in claim 4, wherein the slurry chamber comprises a plurality of slurry inlets (33).

18. Chamber filter press as claimed in claim 17, wherein the slurry inlets (33) are located on the center line (34) of the pressure membrane (6).

19. Chamber filter press as claimed in claim 17, wherein the slurry inlets (33) are connected to a collecting pipe (36) through individual pipes (35).

20. Chamber filter press as claimed in claim 17, wherein the slurry inlets (33) contain locking valves (37) and the collecting pipe (36) contains a non-return valve (38).

21. Chamber filter press as claimed in claim 6, wherein at least one outlet (41) of a pipe (39) actuated by valves (40) are provided in the pressure membrane (6) for a washing or cleaning medium.

22. Chamber filter press as claimed in claim 5, wherein the sealing lips (21) can be moved up and down with positive control by means of a drive (73).

23. Chamber filter press as claimed in claim 22, wherein the drive (73) is formed by a number of controllable pressure generators (65) located on the sealing lips (21), wherein the pressure generators press or raise the sealing lips (21) relative to the upper pressure plate (9) towards or from the filter belt (10).

24. Chamber filter press as claimed in claim 23, wherein the pressure generators (65) are in the form of pneumatic cylinders (66) which can be actuated to open and close the slurry chamber (2) by raising and lowering the sealing lips (21).

25. Chamber filter press as claimed in claim 24, wherein the pneumatic cylinders are braced against the upper pressure plates (9) such that the sealing pressure is increased by compressing the air in the pneumatic cylinders (66) in the pressure stroke of the upper pressure plates (9).

26. Chamber filter press as claimed in claim 21, wherein each end of each of said upper pressure plates (9) includes two pneumatic cylinders (66).

27. Chamber filter press as claimed in claim 26, wherein a plurality of pneumatic cylinders (66) are distributed over the length of the pressure plates (9) located on the face ends of the slurry chamber (2).

28. Chamber filter press as claimed in any one of claims 25 to 27, wherein the piston rods (67) of the pneumatic cylinders (66) are connected to the reinforcement strip (59) of the sealing lip (21) by an articulated joint.

29. Chamber filter press as claimed in claim 28, wherein the connection of the piston rods (67) to the reinforcement strip (59) is opposite the center line of the sealing element (60).

30. Chamber filter press as claimed in claim 23, wherein the hydraulic high-pressure generators (22) are in the form of single cylinders (71) with one plunger (72).

31. Chamber filter press as claimed in claim 5, wherein a plate (45) having upward-opening filtrate channels (46) is provided in the slurry chamber (2) between the filter belt (10) and the lower pressure plates (8).

32. Chamber filter press as claimed in claim 31, wherein the plate (45) includes a low-friction plastic.

33. Chamber filter press as claimed in claim 4, wherein the pressure surfaces (5, 10) and the pressure membrane (6) are located between the fixed and movable pressure plates (8, 9) which are configured in opposed pairs.

34. Chamber filter press as claimed in claim 4, further comprising a plurality of adjacent pairs of pressure plates (8, 9).

35. Chamber filter press as claimed in claim 4, wherein the lower pressure plates are rigidly mounted, and wherein the upper pressure plates (9) can be moved against the lower pressure plates (8) by means of hydraulic high-pressure generators (22), or vice versa.

36. Chamber filter press as claimed in claim 5, wherein the pressure membrane (6) is connected to the movable pressure plates (9) at least in a central area (23).

37. Chamber filter press as claimed in claim 5, wherein replaceable consumables (25) are fitted at the point of contact (24) between the sealing lips (21) and the filter belt (10).

38. A method for dewatering slurry and similar substances comprising the steps of:
feeding the slurry, by means of a pump, into one of a plurality of slurry chambers having at least one filter surface;
operating the plurality of slurry chambers parallel to each other and in alternate cycles;
continuously driving the pump, the continuous driving step includes the step of switching the individual slurry chambers such that the slurry feed and the discharge of the filter cake substantially proceeds continuously from different slurry chambers;
generating a hydrostatic pressure in the slurry chamber by the driving of the pump to induce dewatering process;
attaining an adjustable pressure level in the slurry chamber;
isolating the slurry chamber from the pump;
reducing the volume of the slurry chamber; and
producing a mechanical dewatering pressure which is greater than the hydrostatic pressure attained,
wherein at any time simultaneously when at least one slurry chamber is being discharged, at least one slurry chamber is being connected to the pump and building up hydrostatic pressure, and at least one slurry chamber is isolated from the pump and is under mechanical dewatering pressure.

39. Chamber filter press for performing the method steps of feeding the slurry, by a pump, into one of a plurality of slurry chambers having at least one filter surface; operating the plurality of slurry chambers parallel to each other and in alternate cycles; continuously driving the pump, the continuous driving step includes the step of switching the individual slurry chambers such that the slurry feed and the discharge of the filter cake substantially proceeds continuously from different slurry chambers; generating a hydrostatic pressure in the slurry chamber by the driving of the pump to induce dewatering process; attaining an adjustable pressure level in the slurry chamber; isolating the slurry chamber from the pump; reducing the volume of the slurry chamber; and producing a mechanical dewatering pressure which is greater than the hydrostatic pressure attained, wherein at any time simultaneously at least one slurry chamber being discharged, at least one slurry chamber being connected to the pump and building up hydrostatic pressure and at least one slurry chamber is isolated from the pump and is being under mechanical dewatering pressure, said chamber filter press comprising: at least one completely enclosed slurry chamber having filter surfaces and having a slurry inlet which is connected by a pipe to a pump generating the filtration pressure, wherein the filter surfaces (5) in the slurry chamber (2) are located between stationary and movable pressure plates (8, 9) and can be repressurized mechanically once the pump (7) has been switched off.

40. Chamber filter press as claimed in any one of claims 22 or 39, comprising:
    a plurality of chamber filter presses (1) parallel to each other;
    a main pipe (50) to which the collecting pipes (36) of the chamber filter presses (1) are connected to, wherein the main pipe (50) is maintained under continuous pressure by the pump (7); and
    a control system (51) which controls the non-return valves (38), the locking valves (37), the high-pressure generators (22), the pneumatic cylinders (66) and the drive of the filter belt (10) in accordance with the working cycle of the individual chamber filter presses (1) such that the slurry feed and the discharge of the filter cake proceeds quasi-continuously, though from different slurry chambers (2) by having simultaneously at any time at least one slurry chamber (2) being discharged, at least one slurry chamber (2) being connected to the pump (7) and building up hydrostatic pressure and at least one slurry chamber (2) being isolated from the pump (7) and being under additional mechanical dewatering pressure.

41. Chamber filter press as claimed in any one of claims 5 or 39, comprising:
    a plurality of chamber filter presses (1) parallel to each other;
    a main pipe (50) to which the collecting pips (36) of the chamber filter presses (1) are connected to, wherein the main pipe (50) is maintained under continuous pressure by the pump (7); and
    a control system (51) for controlling the non-return valves (38), the locking valves (37), the high-pressure generators (22), the pneumatic cylinders (66) and the drive of the filter belt (10) in accordance with the working cycle of the individual chamber filter presses (1) such that the slurry feed and the discharge of the filter cake proceeds quasi-continuously, though from different slurry chambers (2) by having simultaneously at any time at least one slurry chamber (2) being discharged, at least one slurry chamber (2) being connected to the pump (7) and building up hydrostatic pressure and at least one slurry chamber (2) being isolated from the pump (7) and under additional mechanical dewatering pressure.

* * * * *